United States Patent
Ahn et al.

(10) Patent No.: US 12,292,588 B2
(45) Date of Patent: May 6, 2025

(54) OPTICAL SHEET AND METHOD FOR MANUFACTURING OPTICAL SHEET

(71) Applicant: SHINWHA INTERTEK CORP, Chungcheongnam-do (KR)

(72) Inventors: Cheol Heung Ahn, Chungcheongnam-do (KR); Do Hyoung Kim, Gyeonggi-do (KR); Seok Min Kang, Chungcheongnam-do (KR); Ka Young Son, Incheon (KR); Min Tae Kim, Gyeonggi-do (KR); Chang Min Han, Chungcheongnam-do (KR)

(73) Assignee: SHINWHA INTERTEK CORP, Chungcheongnam-do (KR)

( * ) Notice: Subject to any disclaimer, the term of this patent is extended or adjusted under 35 U.S.C. 154(b) by 520 days.

(21) Appl. No.: 17/798,887

(22) PCT Filed: Jan. 27, 2021

(86) PCT No.: PCT/KR2021/001080
§ 371 (c)(1),
(2) Date: Aug. 11, 2022

(87) PCT Pub. No.: WO2021/167259
PCT Pub. Date: Aug. 26, 2021

(65) Prior Publication Data
US 2023/0104988 A1      Apr. 6, 2023

(30) Foreign Application Priority Data

Feb. 21, 2020  (KR) .................. 10-2020-0021489
Jan. 27, 2021  (KR) .................. 10-2021-0011247

(51) Int. Cl.
*G02B 5/30*      (2006.01)
*G02B 1/14*      (2015.01)

(52) U.S. Cl.
CPC ............... *G02B 5/305* (2013.01); *G02B 1/14* (2015.01)

(58) Field of Classification Search
CPC ........ G02B 5/305; G02B 1/14; G02B 5/0278; G02B 5/021; G02B 5/0294; B29D 11/00
See application file for complete search history.

(56) References Cited

U.S. PATENT DOCUMENTS

| | | | |
|---|---|---|---|
| 2016/0084999 A1* | 3/2016 | Shibata | G02B 5/0236 359/581 |
| 2016/0146982 A1* | 5/2016 | Boyd | G02B 5/045 359/489.01 |

(Continued)

FOREIGN PATENT DOCUMENTS

| | | |
|---|---|---|
| JP | 2010-230714 | 10/2010 |
| JP | 5015960 | 9/2012 |

(Continued)

OTHER PUBLICATIONS

International Search Report for PCT/KR2021/001080 mailed on Apr. 29, 2021 (now published as WO 2021/167259) with English translation provided by WIPO.

(Continued)

*Primary Examiner* — Mariam Qureshi
(74) *Attorney, Agent, or Firm* — WOMBLE BOND DICKINSON (US) LLP

(57) ABSTRACT

An optical sheet and a method for manufacturing the optical sheet are provided. The optical sheet comprises: a first substrate; a first resin layer disposed on one surface of the substrate; a second resin layer disposed on one surface of the first resin layer; and a third resin layer disposed on one surface of the second resin layer, wherein the first resin layer includes a first one-surface corrugated portion formed on one surface thereof and having a plurality of convex portions and concave portions, the second resin layer includes a (Continued)

second other-surface corrugated portion formed on the other surface thereof and having a pattern shape complementary to that of the first one-surface corrugated portion, the second resin layer includes a second one-surface corrugated portion formed on one surface thereof, having a plurality of convex portions and concave portions and having a surface roughness value greater than that of the first one-surface corrugated portion, and the third resin layer has a third other-surface corrugated portion formed on the other surface thereof and having a pattern shape complementary to that of the second one-surface corrugated portion.

20 Claims, 12 Drawing Sheets

(56) References Cited

U.S. PATENT DOCUMENTS

| | | | |
|---|---|---|---|
| 2017/0307790 A1* | 10/2017 | Bellman | ............... C03C 17/22 |
| 2018/0246373 A1 | 8/2018 | Nakamura et al. | |
| 2022/0137266 A1* | 5/2022 | Ebisu | ............... C08G 18/6225 |
| | | | 359/609 |

FOREIGN PATENT DOCUMENTS

| | | |
|---|---|---|
| KR | 10-2009-0012822 | 2/2009 |
| KR | 10-2011-0065610 | 6/2011 |
| KR | 10-1407440 | 6/2014 |
| KR | 10-1580581 | 12/2015 |
| KR | 10-2016-0086003 | 7/2016 |
| KR | 10-2018-0001239 | 1/2018 |
| KR | 10-2018-0059441 | 6/2018 |

OTHER PUBLICATIONS

Written Opinion of the International Searching Authority for PCT/KR2021/001080 mailed on Apr. 29, 2021 (now published as WO 2021/167259) with English translation provided by Google Translate.
Notice of Allowance dated May 25, 2023 for Korean Patent Application 10-2021-0011247 and its English translation provided by Global Dossier.
Office Action dated Nov. 15, 2022 for Korean Patent Application No. 10-2021-0011247 and its English translation from Global Dossier.
International Preliminary Report on Patentability for PCT/KR2021/001080 issued on Aug. 23, 2022 and its English translation from WIPO (now published as WO 2021/167259).

* cited by examiner (a)

(b)

(c)

OPTICAL SHEET AND METHOD FOR MANUFACTURING OPTICAL SHEET

CROSS-REFERENCE TO RELATED APPLICATIONS

The present application is the national stage of International Patent Application No. PCT/KR2021/001080 filed on Jan. 27, 2021, which claims the priority to Korean Patent Application No. 10-2020-0021489 filed in the Korean Intellectual Property Office on Feb. 21, 2020, and to Korean Patent Application No. 10-2021-0011247 filed in the Korean Intellectual Property Office on Jan. 27, 2021, the entire contents of which are incorporated herein by reference.

TECHNICAL FIELD

The present disclosure relates to an optical sheet on which a plurality of pattern layers having a complementary shape are stacked, and a method for manufacturing the optical sheet.

BACKGROUND ART

A display device such as an LCD or an OLED provides image information using a panel with pixels in a uniform arrangement.

In addition, such a display device can provide good image quality with excellent viewing angle characteristics and excellent contrast ratio characteristics by implementing a variety of optical functions using an optical sheet with a uniform pattern arrangement.

However, when each of the optical sheets has a uniform arrangement, the interference phenomenon of light may cause problems such as moiré, resulting in a reduction in the image quality of the display device.

In order to solve the problem of the image quality reduction of the display device, the arrangement of the pixels and the pattern arrangement of the optical sheet may be made different from each other to minimize the moiré effect. In this case, a problem such as moiré may be generally minimized by tilting an arrangement direction of fine patterns formed in a uniform arrangement on the optical sheet at a predetermined angle compared to the arrangement direction of the pixels.

However, the optical sheet may implement a variety of optical characteristics by forming fine patterns having a size ranging from about tens of nm to about hundreds of nm. The fine pattern of the optical sheet may cause a large number of defects when a pattern mold is processed in a horizontal or vertical direction. In particular, the optical sheet may be tilted and processed at a predetermined angle, which greatly reduces the productivity of the optical sheet.

In addition, an optimal tilt angle may vary depending on the specifications of the display device, leading to a further reduction in quality and productivity, and greatly increasing manufacturing costs accordingly.

Furthermore, higher quality is demanded when a high-visibility optical sheet with a structure of stacking a plurality of pattern layers with fine patterns extending in one direction may be disposed outside the uppermost layer of the display panel to improve the visibility of the display device.

DISCLOSURE

Technical Problem

Aspects of the present disclosure provide a high-visibility optical sheet in which moiré is removed or at least minimized regardless of the specification of a display panel.

Aspects of the present disclosure also provide a method for manufacturing a high-visibility optical sheet in which moiré is removed or at least minimized regardless of the specification of a display panel.

Aspects of the present disclosure also provide a display device including a high-visibility optical sheet in which moiré is removed or at least minimized regardless of the specification of a display panel.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

Technical Solution

According to an aspect of the present disclosure, there is provided an optical sheet, comprising: a first substrate; a first resin layer disposed on one surface of the substrate; a second resin layer disposed on one surface of the first resin layer; and a third resin layer disposed on one surface of the second resin layer. The first resin layer includes a first one-surface corrugated portion formed on one surface thereof and having a plurality of convex portions and concave portions, the second resin layer includes a second other-surface corrugated portion formed on the other surface thereof and having a pattern shape complementary to that of the first one-surface corrugated portion, the second resin layer includes a second one-surface corrugated portion formed on one surface thereof, having a plurality of convex portions and concave portions and having a surface roughness value greater than that of the first one-surface corrugated portion, and the third resin layer includes a third other-surface corrugated portion formed on the other surface thereof and having a pattern shape complementary to that of the second one-surface corrugated portion.

According to the other aspect of the present disclosure, there is provided a method for manufacturing an optical sheet, comprising: providing a firs substrate; forming a first resin layer including a first one-surface corrugated portion on one surface of the first substrate by imprinting a first resin using a first pattern mold; forming a second resin layer including a second one-surface corrugated portion on one surface of the first resin layer by imprinting a second resin using a second pattern mold; forming a third partial resin layer by providing a third resin on the second one-surface corrugated portion of the second resin layer; and forming a third resin layer by providing a second substrate and providing the third resin between the other surface of the second substrate and the third partial resin layer after the other surface of the second substrate and one surface of the third partial resin layer are disposed to face each other at predetermined intervals.

According to the other aspect of the present disclosure, there is provided a method for manufacturing an optical sheet, comprising: forming a first resin layer including a first one-surface corrugated portion on one surface of a first substrate by imprinting a first resin using a first pattern mold; forming a third resin layer including a third other-surface corrugated portion by imprinting a third resin on the other surface of a second substrate using a second pattern mold; and forming a second resin layer including a second other-surface corrugated portion and a second one-surface corrugated portion by providing a second resin between the first resin layer and the third resin layer after one surface of the first resin layer and the other surface of the third resin layer are disposed to face each other at predetermined intervals.

According to another aspect of the present disclosure, there is provided a display device comprising: a display panel and an optical sheet disposed on an upper surface of the display panel. The optical sheet comprises: a first substrate; a first resin layer disposed on one surface of the first substrate; a second resin layer disposed on one surface of the first resin layer; and a third resin layer disposed on one surface of the second resin layer. The first resin layer includes a first one-surface corrugated portion formed on one surface thereof and having a plurality of convex portions and concave portions, the second resin layer includes a second other-surface corrugated portion formed on the other surface thereof and having a pattern shape complementary to that of the first one-surface corrugated portion, the second resin layer includes a second one-surface corrugated portion formed on one surface thereof, having a plurality of convex portions and concave portions and having a surface roughness value greater than that of the first one-surface corrugated portion, and the third resin layer has a third other-surface corrugated portion formed on the other surface thereof and having a pattern shape complementary to that of the second one-surface corrugated portion. The optical sheet is disposed on the upper surface of the display panel such that the first substrate is disposed farther than the third resin layer with respect to the upper surface of the display panel.

Hereinafter, various exemplary embodiments of the present disclosure will be described in detail with reference to the accompanying drawings.

Advantageous Effects

An optical sheet according to embodiments may have excellent viewing angle characteristics and excellent contrast ratio characteristics, and can minimize the occurrence of poor image quality such as moiré and sparkling, thereby significantly improving the image quality of a display device, and the optical sheet can remove factors that inevitably increase costs due to an increase in the degree of freedom of design of a pattern, thereby reducing manufacturing costs. In addition, when each component is performed in a continuous process, the quality may be improved compared to a single process including a winding process, and productivity may also be excellent.

In addition, the optical sheet may be disposed at the outermost part of the display device to implement high visibility by improving the wide viewing angle and contrast ratio, and can further improve visibility by preventing moiré and sparkling from occurring in the display device. A variety of processing defects that may occur at the time of processing a pattern mold forming fine patterns having a size ranging from about tens of nm to about hundreds of nm may be viewed in the display device; however, the optical sheet according to one embodiment including a first resin layer can prevent the processing defects from being viewed in the display device.

The effects according to the present disclosure are not limited to the above-described contents, and other various effects are included in the present specification.

MODE FOR DISCLOSURE

Figure 1:
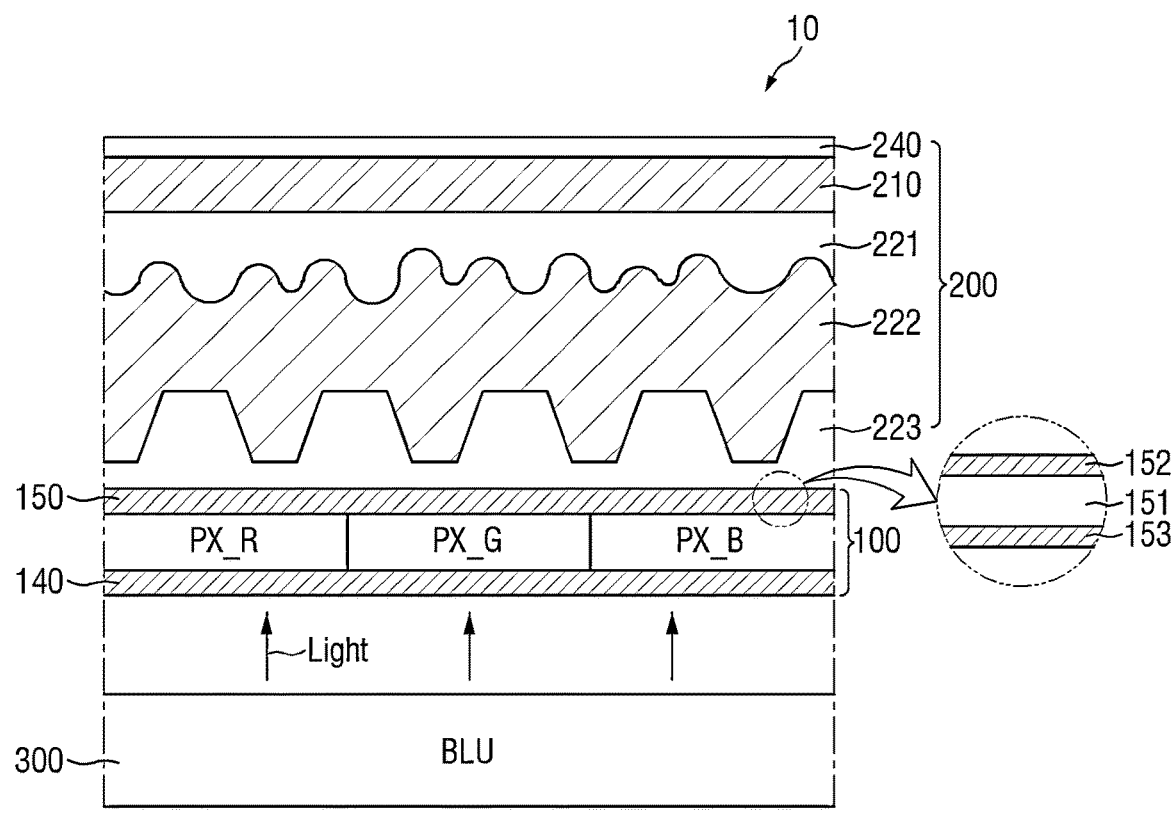
FIG. 1 is a schematic cross-sectional view of a display device according to one embodiment.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims.

Indicating that elements or layers are "on" other elements or layers include both a case in which the corresponding elements are just above other elements and a case in which the corresponding elements are intervened with other layers or elements. In contrast, indicating that elements or layers are "directly on" other elements or layers means a case in which there are no intervening elements or layers. The same reference numerals indicate the same elements throughout the specification. The term "and/or" includes any and all combinations of one or more of the associated listed items.

Although the terms first, second, etc. may be used to describe various elements, it should be understood that these elements are not limited by these terms. These terms are only used to distinguish one element from another. For example, a first element to be described below could be termed as a second element, without departing from the scope of exemplary embodiments.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements.

Unless otherwise defined, all terms (including technical and scientific terms) used herein have the same meaning as commonly understood by those skilled in the art to which the inventive concept pertains. It will be further understood that terms, such as those defined in commonly used dictionaries, should not be interpreted in an idealized or overly formal sense unless expressly so defined herein.

Spatially relative terms, such as "below," "beneath," "lower," "above," "upper," and the like, may be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device may be otherwise oriented, and the spatially relative descriptors used herein may be interpreted accordingly.

Since the terms " . . . sheet", " . . . film", and " . . . layer", which are used in the present disclosure, may have the same meaning, they can be interchangeably used. In addition, a functional optical sheet 200 as the term of the present disclosure may be used as a meaning including an optical film, an optical plate, and an optical film package.

Hereinafter, various embodiments of the present disclosure will be described with reference to the attached drawings:

FIG. 1 is a schematic cross-sectional view of a display device according to one embodiment.

Referring to FIG. 1, a display device 10 is a device for displaying an image. The display device 10 includes a display surface formed on one surface or the other surface thereof. In FIG. 1, a display direction of the display device 10 is upward. In the following embodiment, for the convenience of explanation, a surface facing the display direction among one surface and the other surface of stacked members is referred to as an upper surface, and an opposite surface thereof is referred to as a lower surface. Similarly, a direction in which the upper surface faces along the stacking direction is referred to as an upper part or an upper side, and a direction in which the lower surface faces is referred to as a lower part or a lower side.

The display device 10 includes a display panel 100 and an optical sheet 200 disposed on an upper surface of the display panel 100.

The display panel 100 may include a plurality of pixels PX_R, PX_G, and PX_B that are regularly arranged in at least one direction. The plurality of pixels may include, but are not limited to, a red pixel (PX_R), a green pixel (PX_G), and a blue pixel (PX_B). The display panel 100 may be a liquid crystal display panel, and even though the display panel 100 is illustrated below, the present disclosure is not limited thereto, and various other display panels such as an electrophoretic display panel, an organic light-emitting display panel, and a micro-LED display panel, and the like may be applied to the present disclosure.

The display panel 100 may include a first substrate, a second substrate disposed to be spaced apart from the first substrate and facing the first substrate, and a liquid crystal layer interposed between the first substrate and the second substrate. The display panel 100 may include a pixel electrode and a common electrode for applying an electric field to the liquid crystal layer. The pixel electrode may be provided for each pixel, and the common electrode may be disposed over a plurality of or all pixels. In an embodiment, the pixel electrode may be disposed on the first substrate, and the common electrode may be disposed on the second substrate, but the present disclosure is not limited thereto. The display panel 100 may further include the second substrate or a color filter disposed on the second substrate or the first substrate. The display panel 100 may further include polarizing films 140 and 150 disposed at an upper surface and/or a lower surface. For example, the display panel 100 may include an upper polarizing film 150 disposed on an upper surface of the second substrate and a lower polarizing film 140 disposed on a lower surface of the first substrate. The upper polarizing film 150 may be attached to the upper surface of the second substrate, and the lower polarizing film 140 may be attached to the lower surface of the first substrate.

The upper polarizing film 150 may include a polarizing layer 151 and an upper protective film 152 and a lower protective film 153 for protecting both surfaces of the polarizing layer 151. The polarizing layer 151 may include polyvinyl alcohol, and the protective films 152 and 153 may include triacetylcellulose (TAC), but the present disclosure is not limited thereto. The upper polarizing film 150 may further include a polarizing adhesive layer between the polarizing layer 151 and the protective films 152 and 153. The lower polarizing film 140 may also have substantially the same stack structure as the upper polarizing film 150.

When the display panel 100 is a light receiving element such as a liquid crystal display panel or an electrophoretic display panel, the display device 10 may further include a backlight unit 300 disposed in a lower part of the display panel 100. The backlight unit 300 may include a light source and optical members. The light source may be an LED light source, but the present disclosure is not limited thereto. The optical member may include at least one of a light guide plate, a diffusion plate, a prism film having a linear pattern, a micro-lens film including a point pattern with a regular arrangement or an irregular arrangement, a diffusion film including organic or inorganic particles, and a reflective polarization film having a transmission axis in the same direction as a transmission axis of the lower polarizing film 140.

The optical sheet 200 is disposed on the upper surface of the display panel 100. The optical sheet 200 may have the same planar shape as the display panel 100. The optical sheet 200 may be attached to the upper surface of the display panel 100. When the upper polarizing film 150 forms the upper surface of the display panel 100, the optical sheet 200 may be attached to an upper surface of the upper polarizing film 150, specifically, to an upper surface of the upper protective film 152. In some embodiments, the upper protective film 152 of the upper polarizing film 150 may be omitted, and in this case, the optical sheet 200 may be attached to an upper surface of the polarizing layer of the upper polarizing film 150. Specifically, a third resin layer 223 may be in direct contact with and coupled to the upper protective film 152 of the upper polarizing film 150.

The optical sheet 200 may include a plurality of resin layers 221, 222, and 223 stacked in a thickness direction. The optical sheet 200 may further include a first substrate 210 in addition to the resin layers 221, 222, and 223. The first substrate 210 may act to support and protect the resin layers 221, 222, and 223.

Each of the resin layers 221, 222, and 223 may include a surface pattern on at least one surface thereof. The surface pattern of one surface of the resin layers 221, 222, and 223 may have a complementary relationship with a surface pattern of the other surface of adjacent resin layers opposite thereto. The adjacent resin layers 221, 222, and 223 may contact each other, but may have different refractive indexes. Accordingly, an interface between the adjacent resin layers 221, 222, and 223 may form an optical interface through which optical path modulation such as refraction or reflection of light is performed. As described above, the optical sheet 200 may perform optical functions such as reduction of the moiré of the display device 10 and improvement of the viewing angle characteristics and contrast ratio characteristics via the optical interface with a pattern shape disposed within the optical sheet 200.

Hereinafter, the optical sheet 200 described above will be described in more detail.

Figure 2:
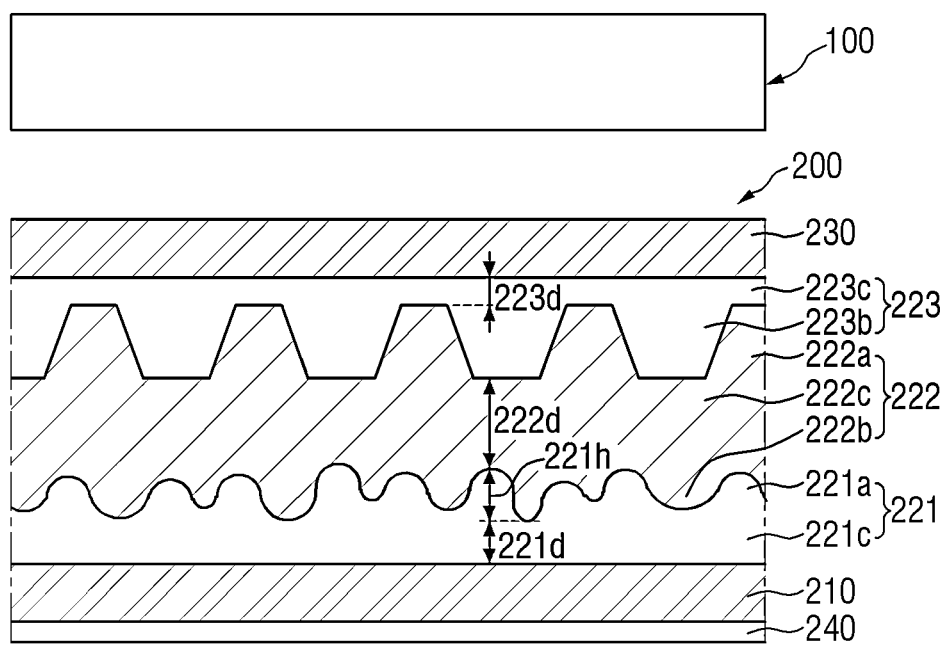
FIG. 2 is a cross-sectional view of an optical sheet according to one embodiment.
Figure 3:
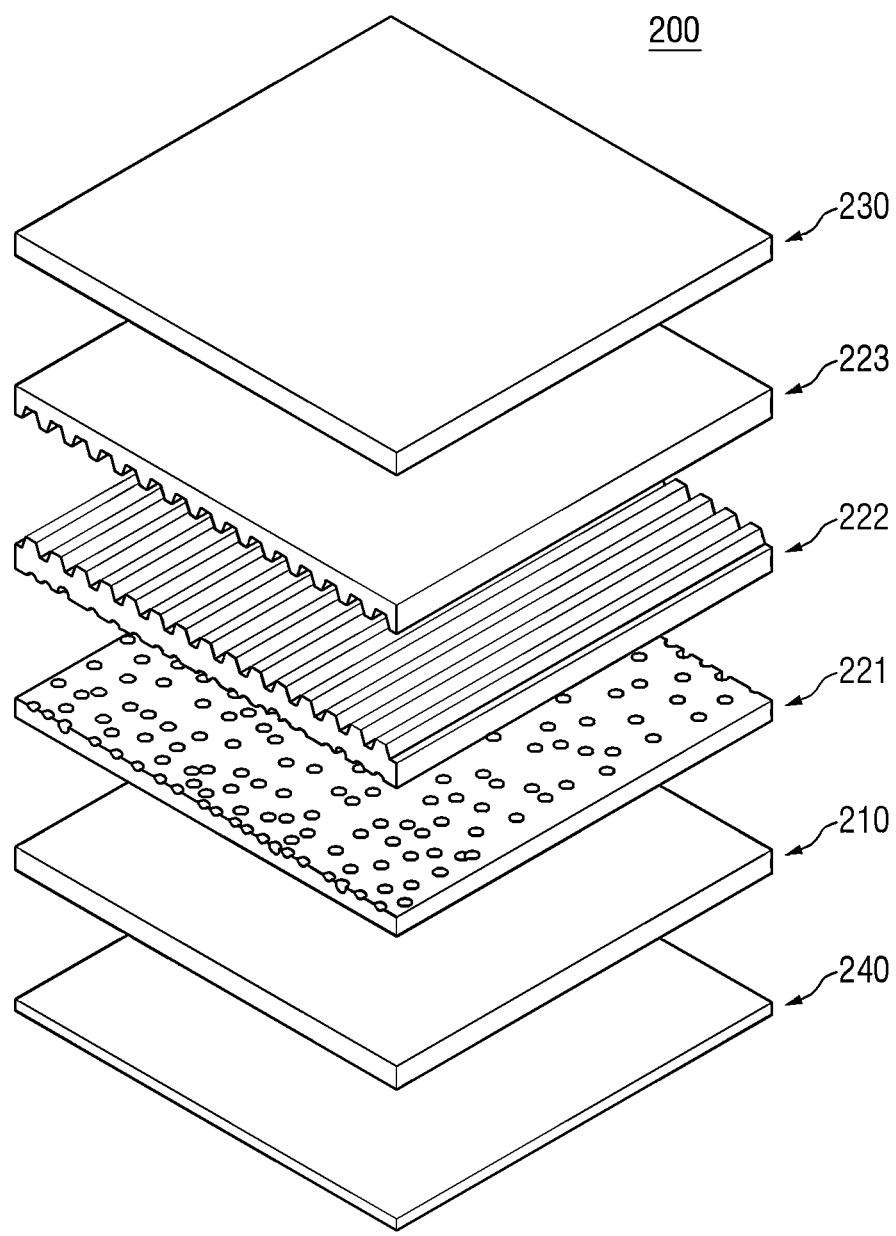
FIG. 3 is an exploded perspective view of FIG. 2.

FIG. 2 is a cross-sectional view of the optical sheet according to one embodiment. FIG. 3 is an exploded perspective view of FIG. 2. In the drawings of the optical sheets in FIGS. 2 and 3, unlike FIG. 1, the first substrate 210 is inverted upward and downward so as to be disposed at the lowest part. In the optical sheet 200, a surface (a surface facing upward in FIGS. 2 and 3) on which a stacked structure faces the display panel 100 is referred to as one surface, and a surface (a surface facing downward in FIGS. 2 and 3) on which the stacked structure faces the display direction is referred to as the other surface.

Referring to FIGS. 1 to 3, the optical sheet 200 may include the first substrate 210, and a first resin layer 221, a second resin layer 222 and a third resin layer 223 which are sequentially stacked on one surface of the first substrate 210. The optical sheet 200 may be attached to the upper surface of the display panel 100 through one surface of the third resin layer 223.

The first substrate 210 may include a transparent resin used as a material for an optical film. For example, the first substrate 210 may include a material of a film generally applied to an optical film such as polyethylene terephthalate (PET), polycarbonate (PC), polyethylene (PE), polypropylene (PP), polysulfone (PSF), polymethyl methacrylate (PMMA), triacetylcellulose (TAC), a cycloolefin polymer (COP), or a cycloolefin copolymer (COC). The light transmittance of the first substrate 210 may be 90% to 99.9%. The first substrate 210 may have a uniform thickness. In addition, one surface and the other surface of the first substrate 210 may be flat.

The optical sheet 200 may further include an additional layer such as an anti-reflection layer 240 or an adhesive layer disposed on one surface and/or the other surface of the first substrate 210.

When the anti-reflection layer 240 is disposed on the other surface of the first substrate 210, an anti-reflection effect due to external light together with a surface corrugation of the first resin layer 221 may be increased. The anti-reflection layer 240 may have a multilayer structure in which a hard coating layer, a high refractive layer, and a low refractive layer are sequentially stacked, but the present disclosure is not limited thereto. The anti-reflection layer 240 may include a structure with a high refractive layer removed, or a pattern layer including a corrugation or a bead coating layer. For example, the anti-reflection layer 240 may be an anti-reflection layer in which the hard coating layer/the low refractive layer or the hard coating layer/the high refractive layer/the low refractive layer are sequentially stacked on the other surface of the first substrate 210. Herein, a refractive index difference between the low refractive layer and the high refractive layer may be greater than a maximum refractive index difference between the first to third resin layers 221, 222, and 223. The refractive index of the high refractive layer may be greater than that of the second resin layer 222, and the refractive index of the low refractive layer may be smaller than that of the third resin layer 223.

In addition, when the adhesive layer is disposed on one surface and/or the other surface of the first substrate 210, the first resin layer 221 or other layers or films may be easily additionally attached.

The first resin layer 221 is disposed on one surface of the first substrate 210. The first resin layer 221 may include a transparent first resin. For example, the first resin layer 221 may include a photocurable resin such as an epoxy acrylate resin, a urethane acrylate resin, a silicon acrylate resin, or a thermosetting resin such as an acrylic resin, a urethane resin, or a polyester resin. The first resin constituting the first resin layer 221 may have a light transmittance of 95% or more. The first resin layer 221 may have a refractive index of 1.4 to 1.55 based on a solid-state refractive index (which may be different from a liquid refractive index before curing) that is a refractive index after curing. In some embodiments, the first resin layer 221 may have the same refractive index as that of the first substrate 210.

The first resin layer 221 may be formed directly on one surface of the first substrate 210 via an imprinting or lamination process. The other surface of the first resin layer 221 may be in contact with one surface of the first substrate 210. When one surface of the first substrate 210 is flat, the other surface of the first resin layer 221 facing the same may also be flat.

The first resin layer 221 may include a surface corrugated portion disposed on one surface thereof. A one-surface corrugated portion (hereinafter referred to as a first one-surface corrugated portion 221a) of the first resin layer 221 may include a plurality of convex portions and concave portions. The concave portion of the first one-surface corrugated portion 221a may refer to a portion recessed toward a first relief portion 221c to be described below.

A pattern height 221h of the first one-surface corrugated portion 221a may be defined by a height difference between the convex portion and the concave portion. The plurality of convex portions and a plurality of concave portions may be at different heights on the basis of the other surface of the first resin layer 221. An average pattern height (see "221h") of the first one-surface corrugated portion 221a may be calculated by a difference between an average height of the concave portions and an average height of the convex portions.

The patterns of the first surface corrugated portions 221a may be connected by the first relief portion 221c. That is, the first resin layer 221 may include the first relief portion 221c and the first one-surface corrugated portion 221a integrally connected to one side (downward with respect to FIG. 1) of the first relief portion 221c, in a thickness direction.

A thickness of the first relief portion 221c may be defined as a distance from the other surface of the first resin layer 221 to the concave portion of the first one-surface corrugated portion 221a. A thickness 221d of the first relief portion may be different for each section. An average thickness (see "221d") of the first relief portion 221c may be calculated as an average of a distance from each concave portion of the first surface corrugated portion 221a to the other surface of the first resin layer 221. The average thickness (see "221d") of the first relief portion 221c may be greater than 0 and less than a maximum height (a maximum height between the convex portion and the concave portion) of the first one-surface corrugated portion 221a, but the present disclosure is not limited thereto. The average thickness (see "221d") of the first relief portion 221c may be greater than a maximum height (see "221h") of the first one-surface corrugated portion 221a when satisfying surface roughness, maximum depth, and/or specular reflectance numerical ranges for preventing moiré and sparkling defects. In addition, the average thickness (see "221d") of the first relief portion 221c may be greater than a surface roughness Ra of the first one-side corrugated portion 221a, and the average thickness (see "221d") of the first relief portion 221c may be three to 10 times greater than the surface thickness Ra of the first one-side corrugated portion 221a so as to achieve excellent productivity while preventing the moiré and sparkling defects. When the average thickness (see "221d") of the first relief portion 221c is formed as a thin film less than three times the surface roughness Ra of the first one-side corrugated portion 221a, for example, the thickness may be 3 um, and in this case, at the time of forming the first one-surface corrugated portion 221a, the thickness is difficult to control and the adhesion to the first substrate 210 may be not sufficient to cause peeling defects, resulting in a decrease in production speed. On the other hand, when the average thickness (see "221d") of the first relief portion 221c is formed as in a thick film more than 10 times the surface roughness Ra of the first one-side corrugated portion 221a, the production speed may be excellent, but an amount of input raw materials may increase, raising material costs, and much influence from the external environment may reduce shrinkage/expansion characteristics, leading to defects such as bending.

Figure 4:
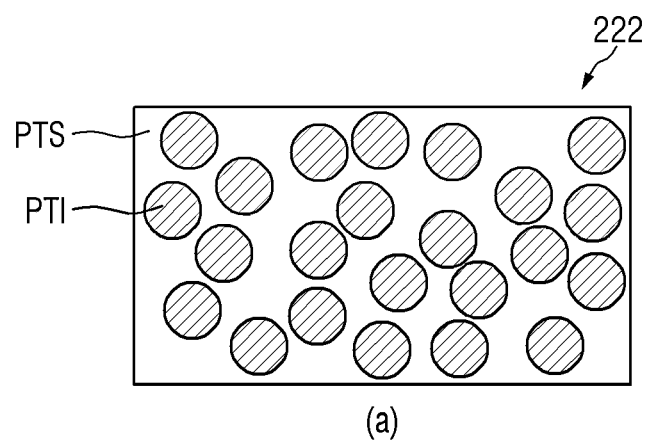
FIG. 4 is a series of top plan views of a first resin layer according to various embodiments.
Figure 4:
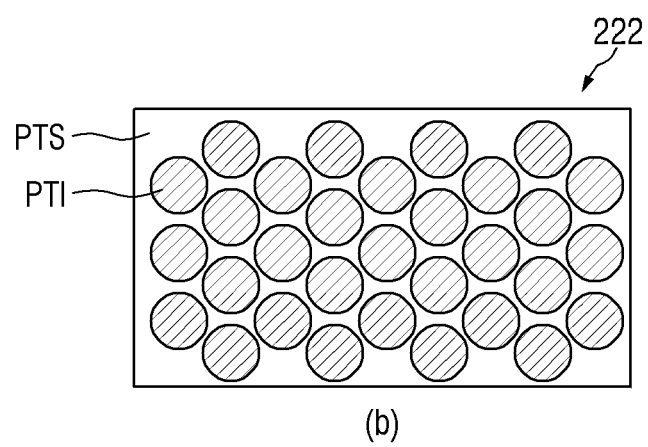
Figure 4:
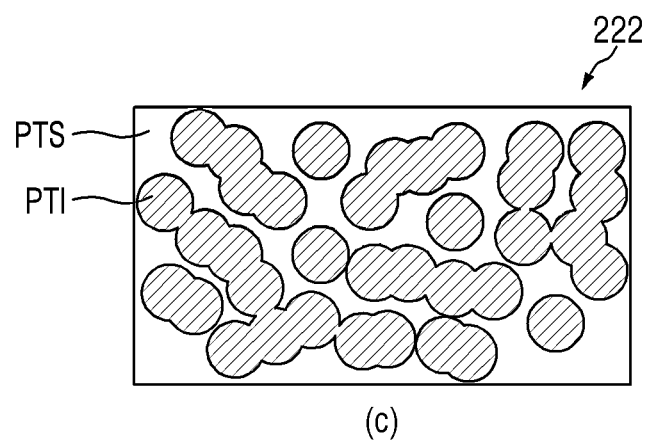
Figure 5:
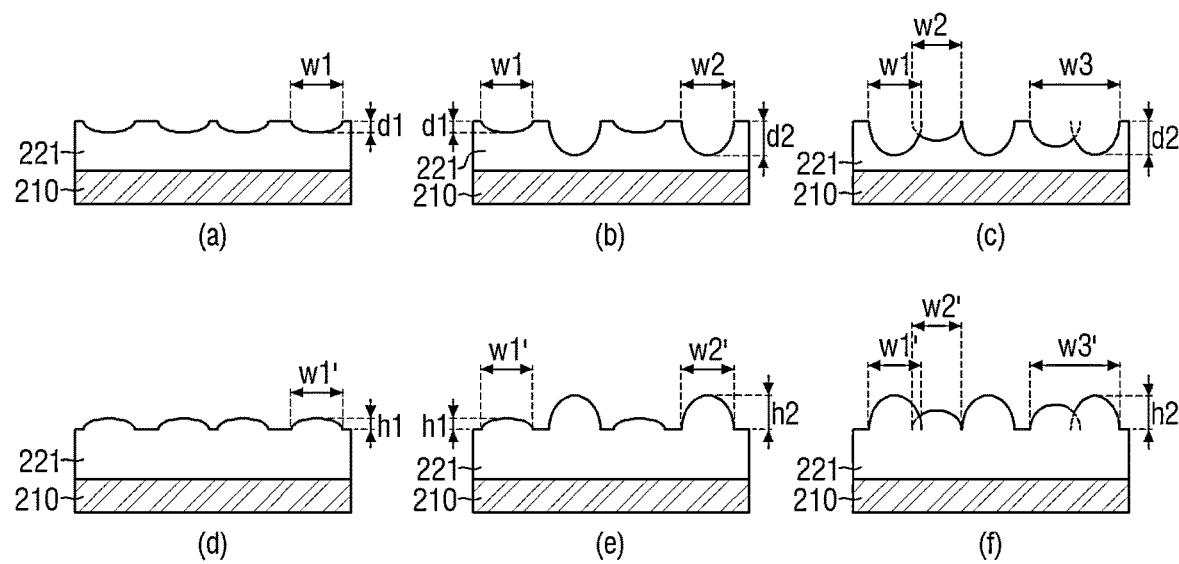
FIG. 5 is a series of cross-sectional views of the first resin layer according to various embodiments.
Figure 6:
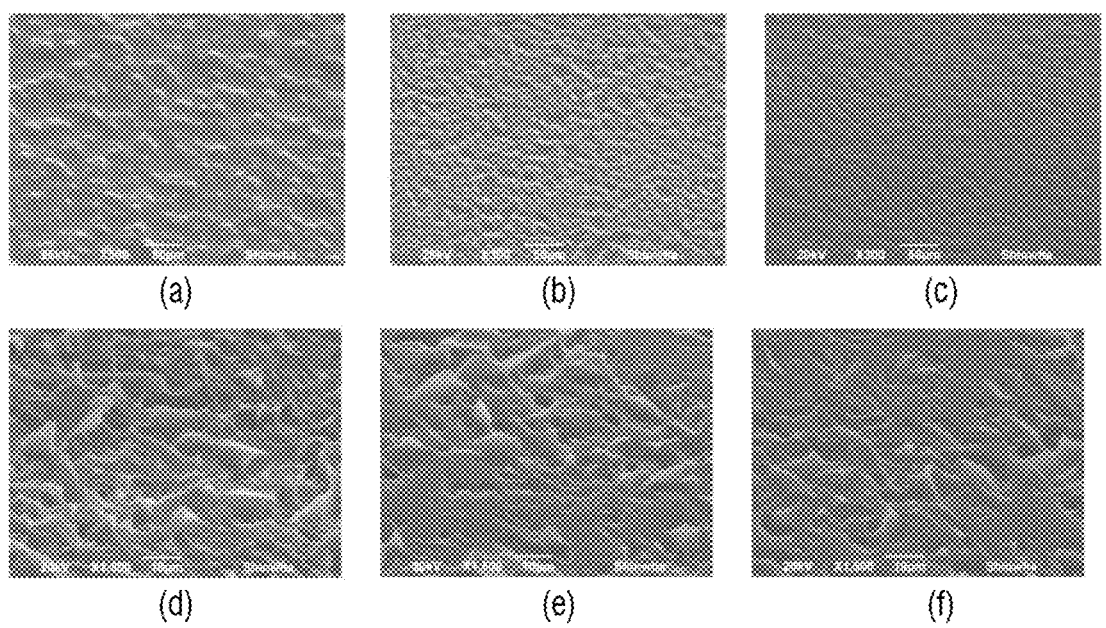
FIG. 6 illustrates planar SEM images of the first resin layer according to various embodiments.

In one embodiment, one of the convex portion and the concave portion of the first one-surface corrugated portion 221a may be a point-type pattern intermittently formed, and the other one may be a plane-type pattern in which the whole is continuously formed to surround each of the point-type patterns. The point-type pattern of the first one-surface corrugated portion 221a may be regularly arranged or irregularly arranged. The convex portion and the concave portion of the first one-surface corrugated portion 221a may include a hilly pattern or an amorphous pattern. The hilly pattern may be a kind of hemispherical pattern in which a minimum diameter of the convex portion is two times greater than the height, and the amorphous pattern may have a shape including concave portions that are not shaped and convex portion with a flat surface. FIGS. 4 to 6 are referenced for a detailed description of the shape of the first one-surfaced corrugated portion 221a.

FIG. 4 is a series of top plan views of a first resin layer according to various embodiments. FIG. 4(a) is a view illustrating an irregular arrangement of point patterns, FIG. 4(b) is a view illustrating a regular arrangement of point patterns, and FIG. 4(c) is a view illustrating a shape of point patterns irregularly disposed by including an overlapping pattern where a convex portion or concave portion pattern overlaps an adjacent pattern. When the first resin layer 221 includes the overlapping pattern as illustrated in FIG. 4(c), it may more effectively prevent image quality from being degraded due to a sparkling (glittering) phenomenon.

As illustrated in FIG. 4, the first resin layer 221 may include a planar point-type pattern (PTI) and a plane-type pattern (PTS) surrounding the same. In one embodiment, the point-type pattern PTI may be a concave portion and the plane-type pattern PTS may be a convex portion, but conversely, the point-type pattern PTI may be a convex portion and the plane-type pattern PTS may be a concave portion. An arrangement of the point pattern PTI may be regular or irregular. Although FIG. 4 illustrates that each point-type pattern PTI has the same plane size, the present disclosure is not limited thereto and the point-type pattern PTI may have different sizes. In addition, although a planar shape of the point pattern (PTI) is exemplified as a circular shape or a shape overlapping a plurality of circular shapes in the figure, the shape can be deformed into various other shapes such as an oval shape, a polygonal shape, etc.

FIG. 5 is a series of cross-sectional views of the first resin layer according to various embodiments.

FIG. 5(a) to FIG. 5(c) illustrate cross-sectional views of the first resin layer 221 in which each of the concave portions has a point-type pattern. In detail, FIG. 5(a) illustrates that the concave portion has a relatively larger area than the convex portion and each of the concave portions has the same size, and FIG. 5(b) illustrates that the concave portion has a relatively larger area than the convex portion, and at least part of the concave portion has different sizes. FIG. 5(c) illustrates a shape where the concave portion has a relatively larger area than the convex portion, and at least part of the concave portion overlaps each other. When the concave portions are regularly disposed in a plane as illustrated in FIG. 4(b), at least part of the concave portion pattern as illustrated in FIG. 5(b) or FIG. 5(c) may preferably have different sizes for the purpose of light scattering induction.

The concave portion pattern of FIG. 5(a) may be formed to have a width of w1 and a depth of d1, and may have a relationship of w1>d1. In the embodiment of FIG. 5(a), an average unit area (for example, it may be a total area per unit area with a width and length of 500 um, but the present disclosure is not limited thereto) of the concave portion pattern on the plane may be made larger than an average unit area (for example, it may be a total area per unit area with a width and length of 500 um, but the present disclosure is not limited thereto) of the convex portion pattern, thereby allowing the first resin layer 221 to have a haze value of 70% or more.

The concave portion pattern in FIG. 5(b) may be formed to have different widths (w1, w2, wn . . . ) and different depths (d1, d2, dn . . . ), and may have a relationship of an average width (w ave.)>an average depth (d ave). Herein, the average width (w ave.) and the average depth (d ave.) may be calculated as an average value of the concave portion pattern in the unit area. In the embodiment of FIG. 5(b), the unit area of the concave portion pattern on the plane may be made larger than the unit area of the convex portion pattern, thereby allowing the first resin layer 221 to have a haze value of 70% or more.

The concave portion pattern of FIG. 5(c) includes a shape where the plurality of concave portion patterns having the same size or different sizes overlap each other. In the embodiment of FIG. 5(c), the concave portion pattern may be formed to have different widths (w1, w2, wn . . . ) and different depths (d1, d2, dn . . . ), and may satisfy a relationship of an average width (w ave.)>an average depth (d ave). In the embodiment of FIG. 5(c), the unit part of the concave portion pattern on the plane may be made larger than the unit part of the convex portion pattern, thereby allowing the first resin layer 221 to have a haze value of 70% or more.

FIG. 5(d) to FIG. 5(f) illustrate cross-sectional views of the first resin layer 221 in which each of the convex portion has a point-type pattern. In detail, FIG. 5(d) illustrates that the convex portion has a relatively larger area than the concave portion and each of the concave portions has the same size, and FIG. 5(e) illustrates that the convex portion has a relatively larger area than the concave portion and at least part of the convex portion has different sizes. FIG. 5(f) illustrates a shape where the convex portion has a relatively larger area than the concave portion and at least part of the convex portion overlaps each other. When the convex portions are regularly disposed on the plane as illustrated in FIG. 4(b), at least part of the convex portion pattern as illustrated in FIG. 5(e) or FIG. 5(f) may preferably have different sizes for the purpose of light scattering induction.

The convex portion pattern of FIG. 5(d) is formed to have a width of w1' and a height of h1, and may have a relationship of w1'>h1. In the embodiment of FIG. 5(d), the unit area of the convex portion pattern on the plane may be made larger than the unit area of the concave portion pattern, thereby allowing the first resin layer 221 to have a haze value of 70% or more.

The convex portion pattern of FIG. 5(e) may be formed to have different widths (w1', w2', wn' . . . ) and different heights (h1, h2, hn . . . ), and may have a relationship of an average width (w' ave.)>an average height (h ave). Herein, the average width (w' ave.) and the average height (h ave.) may be calculated as an average value of the convex portion pattern in the unit area. In the embodiment of FIG. 5(e), the unit area of the convex portion pattern on the plane may be made larger than the unit area of the concave portion pattern, thereby allowing the first resin layer 221 to have a haze value of 70% or more.

The convex portion pattern of FIG. 5(f) includes a shape where a plurality of convex portion pattern having the same size or different sizes overlap each other. In the embodiment of FIG. 5(f), the convex portion patterns may be formed to have different widths (w1', w2', wn' . . . ) and different heights (h1, h2, hn . . . ), and may satisfy a relationship of an average width (w' ave.)>an average height (h' ave). In the embodiment of FIG. 5(f), the unit area of the convex portion pattern on the plane may be made larger than the unit area of the concave portion pattern, thereby allowing the first resin layer 221 to have a haze value of 70% or more.

The first resin layer 221 may include at least one arrangement of the concave portion patterns in FIGS. 5(a), 5(b), and 5(c) described above, or at least one arrangement of the convex portion patterns of FIGS. 5(d), 5(e), and 5(f). In some cases, in the first resin layer 221, the concave portion patterns in FIGS. 5(a), 5(b), and 5(c) may be mixed, the convex portion patterns in FIGS. 5(d), 5(e), and 5(f) may be mixed, or the arrangement of the concave portion patterns of FIGS. 5(a) to 5(c) and the arrangement of the convex portion patterns in FIGS. 5(d) to 5(f) may be mixed.

FIG. 6 illustrates planer SEM images of the first resin layer according to various embodiments. FIG. 6(a) illustrates a shape where hemispherical patterns having different sizes are irregularly arranged in a range from 5 to 20 um in diameter. FIG. 6(b) illustrates a shape where relatively small and uniform hemispherical patterns with a diameter in the range from 5 to 10 um compared to FIG. 6(a) are irregularly arranged. FIG. 6(c) is a view illustrating a hilly pattern having a significantly larger width than the height of the convex portion pattern. FIG. 6(d) illustrates shapes of irregularly arranged amorphous patterns according to different haze values. The first resin layer 221 may further include a flat portion in addition to the plurality of convex portions and concave portions. With the increase in the haze value of the first pattern layer, a surface area of the flat portion may decrease, and the maximum height of the convex portions and the concave portion may increase.

In one embodiment, the pattern size of the first one-surface corrugated portion 221a of the first resin layer 221 may be smaller than a unit pattern of a second one-surface corrugated portion 222a of the second resin layer 222 to be described later. The pattern size may be compared with the surface roughness Ra, and the difference in sizes may be three times or more. For example, the surface roughness Ra of the first surface corrugated portion 221a may be in a range from 0.7 to 1.2 μm, and the surface roughness Ra of the second one-surface corrugated portion 222a may be in a range from 4 to 8 μm, but the present disclosure is not limited thereto. The image quality reduction caused by the sparkling (glittering) phenomenon can be further prevented under the aforementioned conditions.

Referring back to FIGS. 1 to 3, the first one-surface corrugated portion 221a and the first relief portion 221c may be made up of the same composition, but may also be made up of different compositions. When the first one-surface corrugated portion 221a and the first relief portion 221c are made up of different materials, the refractive indexes thereof are all in a range from 1.4 to 1.55, but it may be more advantageous for the first relief portion 221c to have a relatively larger refractive index to prevent the moiré of the optical sheet 200.

The first one-surface corrugated portion 221a of the first resin layer 221 is in contact with the other surface of a second resin layer 222 to be described later, and performs a light modulation function at an interface thereof. The first one-surface corrugated portion 221a may include a diffusion and/or scattering function as the light modulation function. The occurrence of the moiré of the optical sheet 200 may be suppressed via the optical modulation function. In one embodiment, the haze value of the first one-surface corrugated portion 221a may be 70% or more. When the haze value of the first one-surface corrugated portion 221a is less than 70%, the moiré reduction effect may be insignificant. When the haze value of the first one-surface corrugated portion 221a is 70% or more, it is possible to effectively prevent the appearance quality from being degraded due to processing defects of the second one-surface corrugated portion 222a of the second resin layer 222 or a third resin layer 223 to be described below. Preferably, the haze value of the first one-surface corrugated portion 221a may be between 80% to 95%.

In addition, the surface roughness Ra of the first one-surface corrugated portion 221a may be between 0.71 um and 1.31 um, preferably between 0.85 um and 1.16 um, and the maximum depth Dmax may be between 5.1 um and 10.2 um, preferably between 8.3 um and 10.2 um. The first one-surface corrugated portion 221a may be a pattern-type anti-reflection layer having a light reflectance (specular reflectance, reference wavelength: 555 nm) of 0.46 to 1.6%. The other surface of the first substrate 210 includes a low refractive layer having a refractive index of 1.4 or less, and may further include a stacked anti-reflection layer with an average light reflectance of 0.1% to 1.0%, preferably 0.1% to 0.5% in a wavelength band of 380 nm to 780 nm.

Under such conditions, a high-visibility optical sheet with minimized moiré and sparkling phenomenon may be implemented. With the increase in the haze value, the moiré and sparkling phenomenon may be minimized, but in this case, since the luminance characteristics of the display device 10 may be significantly lowered, the display device may be preferably formed to have a haze value of 95% or less.

The second resin layer 222 is disposed on one surface of the first resin layer 221. The second resin layer 222 may include a transparent second resin. For example, the second resin layer 222 may include photocurable resins such as an epoxy acrylate resin, a urethane acrylate resin, and a silicon acrylate resin, or thermosetting resins such as an acrylic resin, a urethane resin, and a polyester resin. The first resin constituting the second resin layer 222 may have the light transmittance of 95% or more.

The second resin layer 222 includes the same resin as the first resin layer 221, but may have a refractive index different therefrom. The refractive indexes of the second resin layer 222 and the first resin layer 221 may be adjusted by a variety of monomers indicative of a high refractive index or a low refractive index. Sometimes, a significantly low or high refractive index may be implemented by adding hollow particles and/or metal particles. In the monomer, the second resin layer 222 may include high refractive monomers such as a monomer with a bisphenyl fluoride structure, a monomer with an o-phenyl phenoxy structure, and a monomer with a sulfa group, and the first resin layer 221 may include low refractive monomers such as an isodecyl acrylate (IDA) monomer, a hydroxyethyl acrylate (HEA) monomer, a monomer with a fluorine group. When the low refractive monomers and the hollow particles are added to resins, the refractive index tends to decrease, and when the high refractive monomers and the metal particles are added to resins, the refractive index tends to increase. Even if the second resin layer 222 and the first resin layer 221 are formed based on the same resin, such a phenomenon may be used to differently adjust the refractive index by adding the high refractive monomers or the metal particles to the second resin layer 222 and/or adding the low refractive monomers or the hollow particles to the first resin layer 221.

When the refractive indexes of the first resin layer 221 and the second resin layer 222 are different from each other based on the solid-state refractive index, an optical interface may be formed on interfaces of the first resin layer 221 and the second resin layer 222. The first one-surface corrugated portion 221a and the second other-surface corrugated portion 222a are disposed on the interface, and accordingly, light modulation such as diffusion and scattering may occur to prevent moiré and the like. In order to sufficiently exhibit a moiré improvement effect by a refractive index difference between the second resin layer 222 and the first resin layer 221, the refractive index difference between the second resin layer 222 and the first resin layer 221 may be preferably 0.05 or more. More preferably, the second resin layer 222 may have a refractive index higher than or equal to 0.05 that of the first resin layer 221. More preferably, the second resin layer 222 may have a refractive index greater than or equal to 0.1 that of the first resin layer 221. In one embodiment, the refractive index (solid-state refractive index) of the second resin layer 222 may be 1.59, and the refractive index (solid-state refractive index) of the first resin layer 221 may be 1.48. On the other hand, when there is a very large difference between the refractive indexes, the luminance may decrease, and when using excessive amounts of expensive monomers, hollow particle additives, or metal particle additives, the manufacturing costs may increase. Therefore, the difference in the refractive index is preferably designed in a range of between 0.1 or more and 0.2 or less.

The second resin layer 222 may be formed on one surface of the first resin layer 221 via a direct imprinting or lamination process. The other surface of the second resin layer 222 may be in direct contact with one surface of the first resin layer 221.

The second resin layer 222 may include a surface corrugated portion (hereinafter, referred to as a second one-surface corrugated portion 222a) disposed on one surface thereof and a surface corrugated portion (hereinafter, a second one-surface corrugated portion 222b) disposed on the other surface thereof. Each of the second one-surface corrugated portion 222a and the second other-surface corrugated portion 222b may include a plurality of convex portions and concave portions. The second resin layer 222 may further include a second relief portion 222c that is disposed between a third other-surface corrugated portion 223b (or the second one-surface corrugated portion 222a) and the first one-surface corrugated portion 221a (or the second other-surface corrugated portion 222b) in a thickness direction and that connects patterns of the second one-surface corrugated portion 222a and the second other-surface corrugated portion 222b in a horizontal direction. That is, the second resin layer 222a may include the second one-surface corrugated portion 222a integrally connected to one side (downward with respect to FIG. 1) of the second relief portion 222c in a thickness direction and the second other-surface corrugated portion 222b integrally connected to the other side (upward with respect to FIG. 1) of the second relief portion 222c. The concave portions of the second other-surface corrugated portion 222a and the second other-surface corrugated portion 222b may refer to portions recessed toward the second relief portion 222c, and the convex portions thereof may refer to portions protruding outward based on the second relief portion 222c.

The second other-surface corrugated portion 222b may be in full contact with the first one-surface corrugated portion 221a of the first resin layer 221. The second other-surface corrugated portion 222b may have a shape complementary to a surface shape of the first one-surface corrugated portion 221a and engaged therewith. That is, the second other-surface corrugated portion 222b may have a pattern shape where the convex portion and the concave portion of the first one-surface corrugated portion 221a are inverted. For example, the concave portion of the second other-surface corrugated portion 222b may be complementary to the convex portion of the first one-surface corrugated portion 221a contacting the portion 222b, and the convex portion of the second other-surface corrugated portion 222b may be complementary to the concave portion of the first one-surface corrugated portion 221a contacting the portion 222b. Accordingly, when the first one-surface corrugated portion 221a includes the point-type pattern or the amorphous pattern, the second other-surface corrugated portion 222b may also include the point-type pattern or the amorphous pattern complementary thereto.

Figure 7:
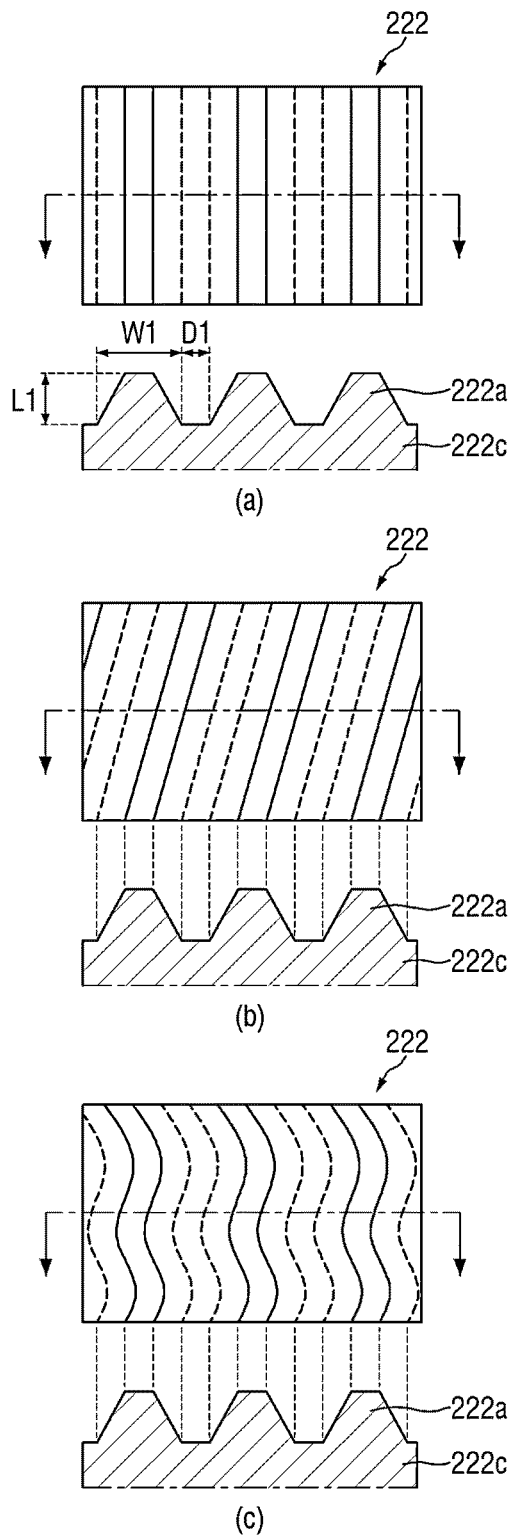
FIG. 7 illustrates planar arrangements and cross-sectional structures of a second one-surface corrugated portion according to various embodiments.
Figure 8:
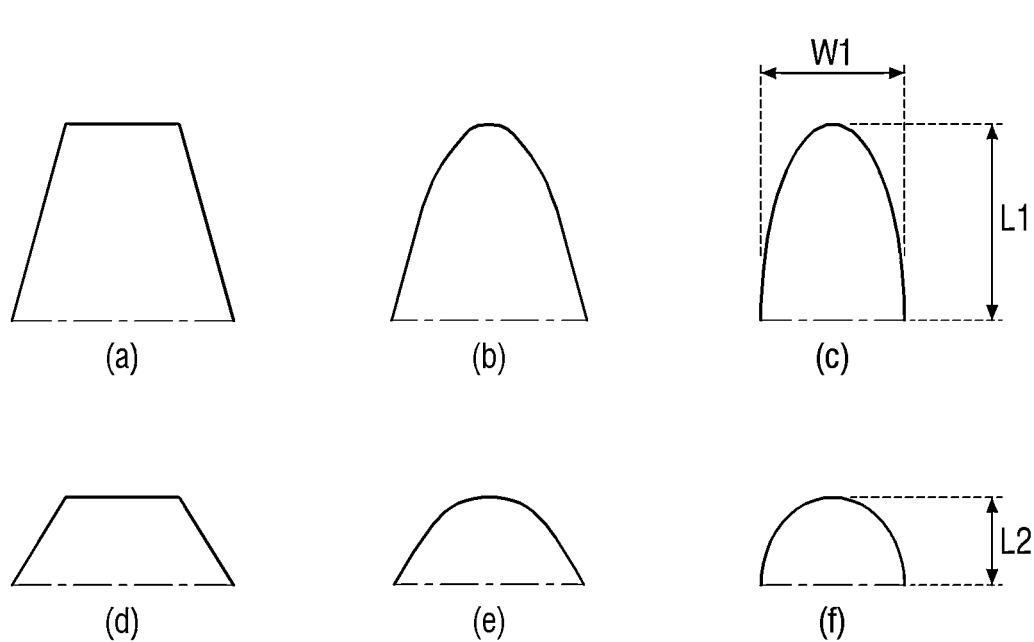
FIG. 8 illustrates cross-sectional shapes of the second one-surface corrugated portion according to various embodiments.

The second one-surface corrugated portion 222a includes the plurality of convex portions and concave portions. Each of the convex portion and the concave portion of the second one-surface corrugated portion 222a may have a linear pattern shape extending in one direction. The convex portion of the second one-surface corrugated portion 222a may have an aspect ratio of 1 or more. The second one-surface corrugated portion 222a may have a pattern shape the same as or similar to a prism pattern, a trapezoidal pattern, or a lenticular pattern. However, the present disclosure is not limited thereto, and the second one-surface corrugated portion 222a may include a plurality of point-type convex portions with an aspect ratio of 1 or more and the same shape and interval to improve the visibility of the display panel in different directions. In addition, an inclined surface forming the convex portion of the second one-surface corrugated portion 222a may be linear, but the present disclosure is not limited thereto. The second one-surface corrugated portion 222a may have a concave or convex shape to have a variety of light modulation characteristics, thereby further improving moiré, sparkling, and viewing angle characteristics. FIGS. 7 and 8 are referenced for a detailed description of the shape of the second one-surface corrugated portion 222a.

FIG. 7 illustrates planar arrangements and cross-sectional structures of the second one-surface corrugated portion according to various embodiments.

Referring to FIG. 7, as illustrated in FIG. 7(a), an extension direction between the convex portion and the concave portion of the second one-surface corrugated portion 222a may be the same as one side extension direction (left and right extension direction in FIG. 7) of the optical sheet 200 (see FIG. 7(*a*)), or the extension direction, as illustrated in FIG. 7(*b*), may be a direction crossing the one side extension direction (left and right extension direction in FIG. 7) at an angle of 45° or less. In some embodiments, the convex and concave portions of the second one-surface corrugated portion 222a may extend in a direction equal to the one-side extending direction (left and right extension direction in FIG. 7) of the optical sheet 200 or a direction crossing the one side extension direction at an angle of 45° or less therefor, as illustrated in FIG. 7(*c*), but may have a shape of bending with a predetermined amplitude and period along the extending direction.

The convex portion and the concave portion of the second one-surface corrugated portion 222a may be alternately arranged in a direction crossing (for example, orthogonal to) the direction in which the corresponding pattern extends.

The convex portion of the second one-surface corrugated portion 222a may include a side portion. The side portion based on the convex portion may have an angle of 90° with respect to the horizontal plane (or second relief portion 222c), or may be inclined at an angle of 90° or less, as illustrated. That is, the side surface portion of the convex portion may have an obtuse angle in which an angle formed with the concave portion connected thereto exceeds 90°. As illustrated in FIG. 7, a cross-sectional structure of the convex portion may have a flat trapezoidal shape at the peak, and a cross-sectional structure of the concave portion may have a flat trapezoidal shape at the valley, but the present disclosure is not limited thereto. For example, the peak of the convex portion and/or the valley of the concave portion may be flat, and the side portion formed by the convex portion and the concave portion may have a concave or convex shape.

FIG. 8 illustrates cross-sectional shapes of the convex portion of a second one-surface corrugated portion according to various embodiments. Although FIG. 8 illustrates only the cross-sectional shape of the convex portion of the second one-surface corrugated portion 222a for convenience, the cross-sectional shape of the concave portion may be equally applied thereto.

Referring to FIG. 8, at least one of the convex portion and the concave portion formed in the second one-surface corrugated portion 222a may include a round-shaped cross-sectional structure. When the convex portion or the concave portion includes the round-shaped cross-sectional structure, the visibility of the display device 10 may be further improved. FIG. 8 illustrates a variety of vertical cross-sectional shapes of the convex portion (or concave portion) constituting the second one-surface corrugated portion 222a. The cross-sectional structure of the convex portion (or concave portion) of the second one-surface corrugated portion 222a may include at least one of a trapezoidal shape (see FIGS. 8(*a*) and 8(*d*)) with a flat peak portion (or valley), a trapezoidal shape (see FIGS. 8(*b*) and 8(*c*)) with a curved peak (or valley), and an oval shape (see FIGS. 8(*c*) and 8(*f*)) with a curved side. Although not illustrated in FIG. 8, the side portions of the concave portion and the convex portion may be a concave or convex streamlined shape rather than a linear shape.

Referring to FIGS. 7 and 8, convex portions (or concave portions) of the second one-surface corrugated portions 222a may be alternately arranged at predetermined intervals D1 along a direction crossing (e.g., orthogonal to) a direction in which the surface corrugated portion extends at a predetermined width W1 and height L1 (or depth). The width W1 may be less than the height L1 (or depth) (see FIGS. 8(*a*) to (*c*)), but the present disclosure is not limited thereto, and the width W1 may be greater than the height L1 (or depth) to improve productivity (see FIGS. 8(*d*) to (*f*)). When the width W1 is less than the height L1 (or depth), the interval D1 may be less than the width W1.

Referring again to FIGS. 1 to 3, the second one-surface corrugated portion 222a and the second other-surface corrugated portion 222b may have different surface roughness Ra. For example, the surface roughness Ra of the second other-surface corrugated portion 222b may be 2 μm or less, and the surface roughness Ra of the second one-surface corrugated portion 222a may be greater than the surface roughness of the second other-surface corrugated portion 222b. The surface roughness value of the second one-surface corrugated portion 222a may be, for example, 10 um or less.

A maximum vertical distance (maximum depth) formed between the convex portion and the concave portion of the second one-surface corrugated portion 222a may be greater than a maximum depth of the first one-surface corrugated portion 221a. For example, the maximum depth of the first one-surface corrugated portion 221a may be between 5 um and 10 um, and the maximum depth of the second one-surface corrugated portion 222a may be between 10 um and 30 um.

A thickness 222d of the second relief portion 222c may be defined as a vertical distance from the concave portion of the second other-surface corrugated portion 222b of the second resin layer 222 to the concave portion of the second one-surface corrugated portion 222a of the second resin layer 222. When the concave portion of the second other-surface corrugated portion 222b and the concave portion of the second one-surface corrugated portion 222a do not overlap each other in a thickness direction, a thickness of the second relief portion 222c may be calculated by a difference between the height of the concave portion of the second one-surface corrugated portion 222a from one surface of the first substrate 210 and the height of the concave portion of the second other-surface corrugated portion 222b from one surface of the first substrate 210. In addition, an average thickness (see "222d") of the second relief portion 222c may be calculated by a difference between an average height of the concave portions of the second one-surface corrugated portion 222a from one surface of the first substrate 210 and an average height of the concave portions of the second other-surface corrugated portion 222b from one surface of the first substrate 210.

The average thickness (see "222d") of the second relief portion 222c may be greater than the average thickness (see "221d") of the first relief portion 221c. When the second relief portion 222c is formed sufficiently thicker than the first relief portion 221c where the surface corrugated portion is formed only at one side thereof, the surface corrugated portions may be easily formed at both sides and reliability of the shape of the surface corrugated portion may be improved.

The second relief portion 222c may be integrated with the same composition as the second one-surface corrugated portion 222a and the second other-surface corrugated portion 222b. The second resin layer 222 may have a uniform refractive index along a thickness direction.

A third resin layer 223 is disposed on one surface of the second resin layer 222. The third resin layer 223 may include a transparent third resin (e.g., a resin with a light transmittance of 95% or more). For example, the third resin layer 223 may include photocurable resins such as an epoxy acrylate resin, a urethane acrylate resin, and a silicon acrylate resin, or thermosetting resins such as an acrylic resin, a urethane resin, and a polyester resin. The third resin layer 223 may be formed of the same material as the first resin layer 221, or may be formed of different materials. When the third resin layer 223 is formed of a material different from that of the first resin layer 221, the third resin layer 223 may be formed of a material with a refractive index greater than that of the first resin layer 221 and a refractive index lower than that of the second resin layer 222.

The third resin layer 223 may further include an adhesive material. The third resin layer 223 may have adhesion and may be attached to the upper surface of the display panel 100. The third resin layer 223 may have the adhesion greater than that of the second resin layer 222 in alkali-free glass. The adhesion of the third resin layer 223 may be 1,000 gf/inch or more or 2,000 gf/inch or more. As the adhesive material of the third resin layer 223, various materials widely known in the pertinent art may be used within a range in which the transparency and adhesive (adhesiveness) of the third resin layer 223 are maintained under the aforementioned conditions. The first resin layer 221 and the third resin layer 223 may include the same adhesive material.

The third resin layer 223 may have different refractive indexes from the second resin layer 222 based on the solid-state refractive index. Even when the third resin layer 223 includes the same material as the second resin layer 222, the refractive indexes thereof may be differently controlled by the monomer, the hollow particle additive, and/or the metal particle additive. For example, when the refractive index of the second resin layer 222 disposed relatively farther than the display panel 100 is greater than the refractive index of the third resin layer 223 disposed closer to the display panel 100, the refraction and/or reflection of light may occur according to the pattern shape of the second one-surface corrugated portion 222a and/or the third other-surface corrugated portion 223b at the interface between the second resin layer 222 and the third resin layer 223, thereby improving a contrast ratio at a high viewing angle.

In order to sufficiently exhibit an effect of improving the contrast ratio at the high viewing angle due to a refractive index difference between the second resin layer 222 and the third resin layer 223, the difference in refractive index between the second resin layer 222 and the third resin layer 223 may be 0.1 or more, and more preferably 0.15 or more. For example, a refractive index (solid-state refractive index) of the second resin layer 222 may be 1.59, and a refractive index (solid-state refractive index) of the third resin layer 223 may be 1.48. On the other hand, when there is a very large difference between the refractive indexes, the luminance may decrease, and when using excessive amounts of expensive monomers, hollow particle additives, or metal particle additives, the manufacturing costs may increase. Therefore, the difference in the refractive index is preferably designed in a range of 0.1 or more and 0.2 or less.

The third resin layer 223 may be formed of the same material as the first resin layer 221 or may have the same refractive index.

The third resin layer 223 may be formed directly on one surface of the second resin layer 222 via the imprinting or lamination process. The other surface of the third resin layer 223 may be in direct contact with one surface of the second resin layer 222. The third resin layer 223 may have a shape that flatly fills the second one-surface corrugated portion 222a of the second resin layer 222 as a whole.

The third resin layer 223 may include a surface corrugated portion (hereinafter, referred to as a third other-surface corrugated portion 223b) disposed on the other surface thereof. The third other-surface corrugated portion 223b may include a plurality of convex portions and concave portions. One surface of the third resin layer 223 may be flat, but the present disclosure is not limited thereto. One surface of the third resin layer 223 may be an attachment surface attached to the upper surface of the display panel 100.

The third other-surface corrugated portion 223b may be in full contact with the second one-surface corrugated portion 222a of the second resin layer 222. The third other-surface corrugated portion 223b may have a shape complementary to a surface shape of the second one-surface corrugated portion 222a and engaged therewith. That is, the third other-surface corrugated portion 223b may have a pattern shape where the convex portion and the concave portion of the second one-surface corrugated portion 2221a are inverted. For example, the concave portion of the third other-surface corrugated portion 223b may be complementary to the convex portion of the second one-surface corrugated portion 222a contacting the portion 223b, and the convex portion of the third other-surface corrugated portion 223b may be complementary to the concave portion of the second one-surface corrugated portion 222a contacting the portion 223b. Accordingly, when the second one-surface corrugated portion 222a includes a linear pattern with a regular arrangement, the third other-surface corrugated portion 223b may also include a linear pattern with a regular arrangement complementary thereto. The height of the patterns of the third other-surface corrugated portion 223b may be the same as the height of the patterns of the second one-surface corrugated portion 222a.

The patterns of the third other-surface corrugated portion 223b may be connected by a third relief portion 223c. That is, the third resin layer 223 may include the third relief portion 223c in a thickness direction and the third other-surface corrugated portion 223b integrally connected to the other side of the third relief portion 223c. The convex portion of the third other-surface corrugated portion 223b may refer to a portion protruding from the third relief portion 223c, and the concave portion may refer to a portion provided between the portions protruding from the third relief portion 223c.

When one surface of the third resin layer 223 is a flat surface, a thickness 223d of the third relief portion 223c may be defined as a distance from one surface of the third resin layer 223 to the concave portion of the third other-surface corrugated portion 223b. The thickness 223d of the third relief portion 223c may be different for each section, and an average thickness (see "223d") of the third relief portion 223c may be calculated as an average of distances from each concave portion of the third other convex portion 223b to one surface of the third resin layer 223. In addition, when a third one-surface corrugated portion 223a to be described below is provided on one surface of the third resin layer 223, the thickness 223d of the third relief portion 223c may be defined as a minimum distance from a horizontal surface formed by the concave portion of the third other-surface corrugated portion 223b to the concave portion of the third other-surface corrugated portion 223b.

The average thickness (see "223d") of the third relief portion 223c may be different from the average thickness (see "222d") of the second relief portion 222c. In one embodiment, the average thickness (see "223d") of the third relief portion 223c may be greater than the average thickness of the second relief portion 222c (see "222d"). That is, the third resin layer 223 having an adhesive function increases the thickness of the third relief portion 223c in order to ensure sufficient adhesion, while the second relief portion 222c of the second resin layer 222 minimizes the thickness to reduce the amount of used raw materials, thereby reducing manufacturing costs and implementing a thin optical sheet 200. However, the present disclosure is not limited thereto, and the second relief portion 222c and the third relief portion 223c may have the same thickness, or the thickness 222d of the second relief portion 222c may be greater than the thickness 223d of the third relief portion 223c. In addition, when the third resin layer 223 includes an adhesive material and is attached to an adhered (portion), the average thickness (see "223d") of the third relief portion 223c may be greater than the average thickness (see "221d") of the first relief portion 221c, and in this case, the adhesion between the third resin layer 223 and the adhered (portion) may be increased.

In some embodiments, the optical sheet 200 may further include a second substrate 230 disposed on one surface of the third resin layer 223. The second substrate 230 may act to protect the third resin layer 223 before the third resin layer 223 is attached to the display panel 100. That is, the second substrate 230 may prevent the third resin layer 223 having an adhesive function from attaching other foreign substances to one surface thereof, and may prevent the optical sheet 200 from being attached to the other surface of the first substrate 210 adjacent in a thickness direction of a winding roll when winding the optical sheet 200 in a roll shape. For example, the second substrate 230 may be a release film. The second substrate 230 may be removed when the optical sheet 200 is attached to the display panel 100. In another embodiment, the third resin layer 223 may not have an adhesive function, and in this case, a protective film with an adhesive layer on the other surface thereof may be attached as the second substrate 230 instead of the release film.

The optical sheet 200 may be attached to the upper surface of the display panel 100 to prevent the moiré phenomenon, which is an optical interference phenomenon, from occurring when two or more periodic patterns overlap each other in the display device 10.

Figure 9:
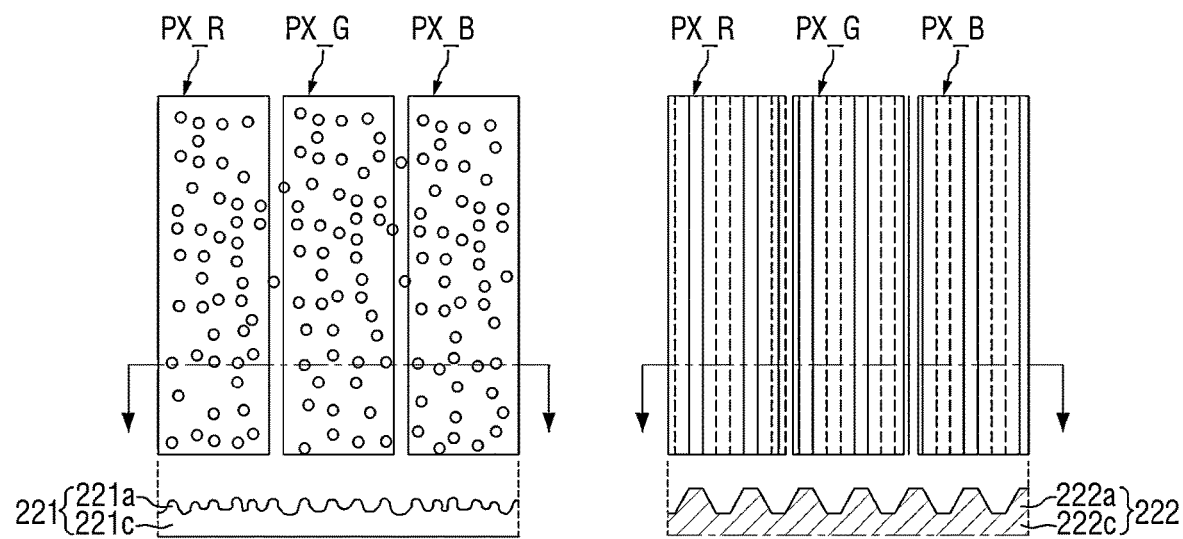
FIG. 9 is a schematic diagram illustrating unit pixels of a display panel and a corrugated portion on a surface of the optical sheet according to one embodiment.

FIG. 9 is a schematic diagram illustrating unit pixels of the display panel and a corrugated portion on a surface of the optical sheet according to one embodiment. FIG. 9(a) illustrates the comparison of a top plan view of the unit pixels PX_R, PX_G, and PX_B of the display panel 100 and a cross-sectional view of the first one-surface corrugated portion 221a of the first resin layer 221, and FIG. 9(b) illustrates the comparison of a cross-sectional view of the unit pixels PX_R, PX_G, and PX_B22 of the display panel 100 and a top plane view of the second one-surface corrugated portion 222a of the second resin layer 222.

Referring to FIG. 9, in the display device 10, the moiré phenomenon may occur due to a relationship between the periodic patterns of the optical sheet 200 and a size and an arrangement of the pixels PX_R, PX_G, and PX_B. In the optical sheet 200 according to an embodiment, the second one-surface corrugated portion 222a of the second resin layer 222 with a periodic and regular pattern arrangement is one of the typical patterns capable of generating the moiré phenomenon.

In order to prevent the moiré phenomenon, a method of differently adjusting the arrangement direction of the periodic patterns of the optical sheet 200 from the arrangement direction of pixels may be considered; however, since the angles at which the moiré is removed or minimized are different for each display device 10, there is a limit to the improvement of the moiré phenomenon by only adjusting the pattern arrangement direction of the optical sheet 200.

The unit pixel (or dot) is generally formed of a combination of a red pixel PX_R, a green pixel PX_G, and a blue pixel PX_B. The shape of one unit pixel formed of a combination of three adjacent different-colored pixels PX_R, PX_G, and PX_B is not limited thereto, but may generally have a square shape or be approximate thereto. The size of the unit pixel varies according to the size and resolution of the display device 10. For example, when the display device 10 is a large TV having the size of 55 to 85 inches and has high resolution such as FHD, 4K, or 8K, the size (length of one side) of the unit pixel may be in the range from about 150 um to 1000 um. The length of the long sides of each color pixels PX_R, PX_G, and PX_B may be identical to the size of the unit pixel, and the length of the short sides may be ⅓ of the length of the long sides. That is, the color pixels PX_R, PX_G, and PX_B may have a width (length of the short side) ranging from about tens of nm to about hundreds of nm.

An average width of the convex portion (or concave portion) of the first one-surface corrugated portion 221a and the second one-surface corrugated portion 222a in a horizontal direction may be formed smaller than the width of the color pixels PX_R, PX_G, and PX_B. For example, the average width of the convex portion (or concave portion) of the second one-surface corrugated portion 222a in the horizontal direction may be 50% or less or 40% or less as compared with the width of the color pixels PX_R, PX_G, and PX_B. In detail, the pattern of the second one-surface corrugated portion 222a may be disposed so as to overlap at least one, preferably at least two, of the convex portions (or concave portions) of the second one-surface corrugated portion 222a with respect to one color pixel PX_R, PX_G, or PX_B along the width direction of the color pixels PX_R, PX_G, and PX_B. For example, the second one-surface corrugated portion 222a may include flat convex portions and flat concave portions extending in one direction, and the plurality of convex portions having a height of 30 um or less and an aspect ratio of 130% to 300% may be spaced apart from each other at narrower intervals than the height thereof, or may be continuously disposed in a direction perpendicular to the one direction, and a maximum depth of 10 um to 30 um. The second one-surface corrugated portion 222a including the convex portions may be formed to have a surface roughness Ra of 5 μm to 10 μm and a maximum depth Dmax in a range from 10 μm to 30 μm.

However, despite the arrangement of the second one-surface corrugated portion 222a as described above, the periodicity of the convex portion (and/or concave portion) of the sub-pixel and the second one-surface corrugated portion 222a may cause the moiré phenomenon. As described above, when the first resin layer 221 has a haze value of 70% or more, such the moiré phenomenon may be prevented. On the other hand, the first one-surface corrugated portion 221a in which the hemispherical, hilly, and amorphous patterns are irregularly arranged may cause a sparkling phenomenon, such that a specular reflectance of the first one-surface corrugated portion 221a is 1.6% or less; however, specifically, when the first one-surface corrugated portion 221a has the surface roughness Ra of 0.85 to 1.16 μm and a maximum depth Dmax of 8.3 to 10.2 μm, the moiré phenomenon may be effectively prevented. In addition, when the first one-surface corrugated portion 221a has characteristics with the haze value of 80% or more, the surface roughness Ra of 0.85 to 1.16 um and the maximum depth Dmax of 8.3 to 10.2 um, and the specular reflectance of 0.46 to 1.22%, the moiré phenomenon may be effective prevented.

In addition, when the surface corrugation is formed such that the first surface unevenness 222a has a haze value of 70% or more, it is possible to prevent appearance quality issues in advance that may occur in the optical sheet 200 or the display device 10 due to poor processing of the second one-surface corrugated portion 222a or the third resin layer 223.

Figure 10:
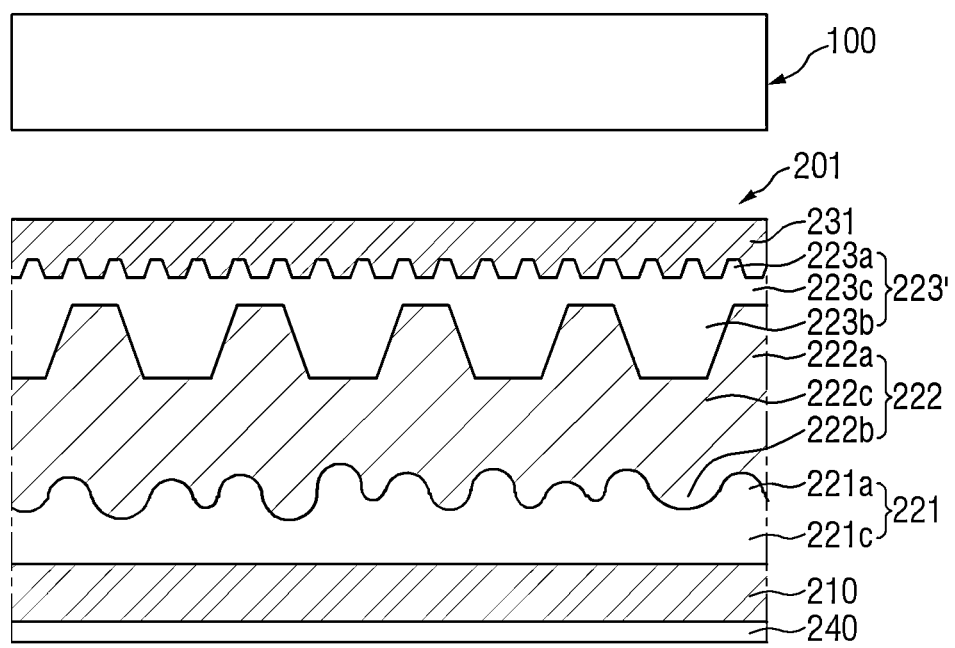
FIG. 10 is a cross-sectional view of the optical sheet according to the other embodiments.

FIG. 10 is a cross-sectional view of the optical sheet according to another embodiment.

Referring to FIG. 10, the optical sheet 201 according to the present embodiment is different from the embodiment in FIG. 2 in that a third resin layer 223' further includes the third one-surface corrugated portion 223a.

Specifically, the third resin layer 223' may further include the third one-surface corrugated portion 223a having a regular arrangement and including a plurality of point-type or linear concave portions. The third one-surface corrugated portion 223a may be formed by a second substrate 231 stacked with a complementary corrugated portion on the other surface thereof. After removing the second substrate 231, when the third one-surface corrugated portion 223a is attached to mutually face the adherend portion such as another optical sheet, a glass plate, or a display panel, the concave portions of the third one-surface corrugated portion 223a may be restored to make one surface of the third resin layer 223' flat. In this case, air bubbles that may occur upon attaching the third resin layer 223 and the adhered portion to each other are temporarily discharged to the outside by the concave portion of the third one-surface corrugated portion223a provided, thereby preventing air bubble defects and further improving the processability of an adhesion process. The surface roughness Ra of the third one-surface corrugated portion 223a is preferably formed in the range from 1 um to 10 um and the maximum depth Dmax thereof is preferably formed in the range from 3 um to 15 um. When the surface roughness Ra and the maximum depth Dmax are formed smaller than minimum values of each of the surface roughness values and the maximum depths, the air bubbles may not be sufficiently discharged. When the surface roughness Ra and the maximum depth Dmax are formed larger than maximum values of each of the surface roughness values and the maximum depths, after attaching some of the concave portions to the adhered (portions), they may not be completely restored or may be viewed as defective stains in the display device due to non-uniformity of restoring force. In addition, in order to prevent defects caused by the concave portions of the third one-surface corrugated portion 223a, the surface area on the plane of the concave portions may be controlled to be 50% or less, preferably 40% or less, and more preferably 30% or less, of the surface area on the plane of the one surface of the third resin layer 223.

Hereinafter, an exemplary manufacturing method of the optical sheet described above will be described.

Figure 11:
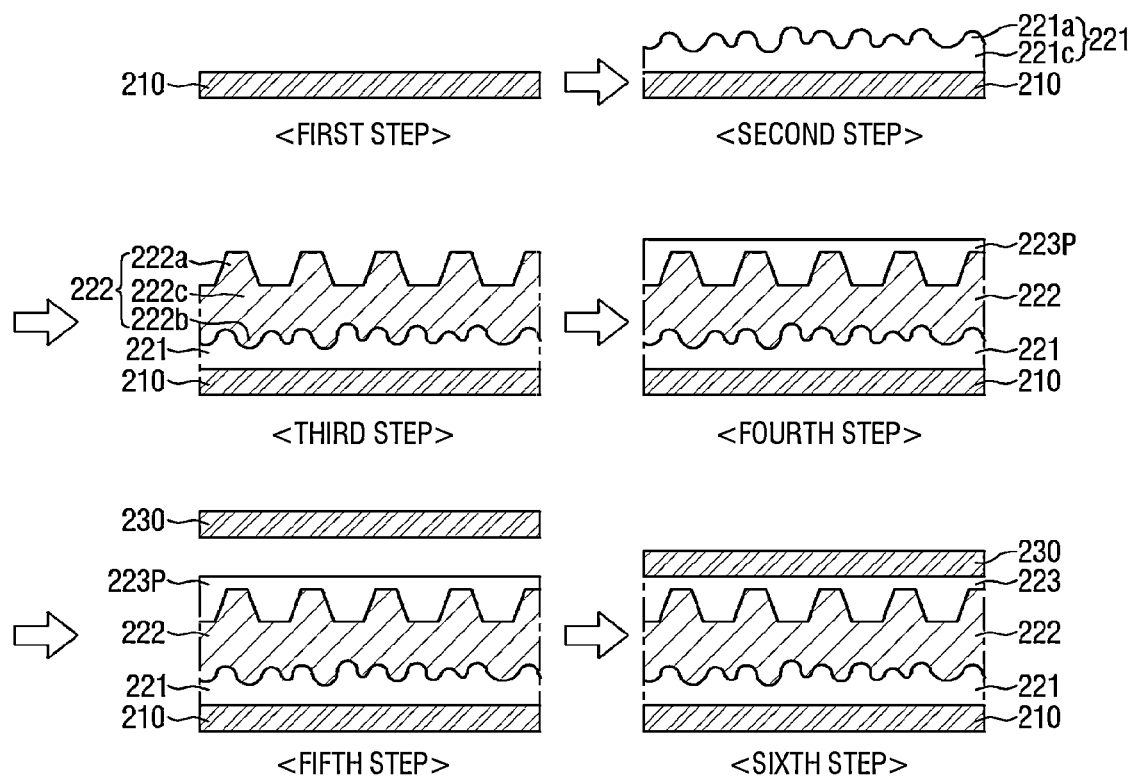
FIG. 11 is a schematic diagram illustrating a method for manufacturing the optical sheet according to one embodiment.

FIG. 11 is a schematic diagram illustrating a method of manufacturing the optical sheet according to one embodiment.

Referring to FIG. 11, the method of manufacturing the optical sheet may be performed in a sequential series process. In FIG. 11, fifth and sixth steps may be simultaneously performed. In addition, each of the steps in FIG. 11 may be continuously performed without a winding process.

As illustrated in FIG. 11, the method of manufacturing the optical sheet may include a first step of providing the first substrate 210, a second step of forming the first resin layer 221 including the first relief portion 221c by imprinting the first resin on one surface of the first substrate 210 using a first pattern mold having a shape complementary to the first one-surface corrugated portion 221a, a third step of forming the second one-surface corrugated portion 222a by imprinting the second resin on one surface of the first resin layer 221 using a second pattern mold having a shape complementary to the second one-surface corrugated portion 222a, and forming the second resin layer 222 including a second other-surface corrugated portion 222b having a shape complementary to one surface of the first resin layer 22, and a second relief portion 222c, a fourth step of forming a third partial resin layer 223p by providing a third resin on the second one-surface corrugated portion222a, and a fifth step of providing the second substrate 230 and disposing the other surface of the second substrate 230 and one surface of the third partial resin layer 223p to face each other at predetermined intervals, and a sixth step of completing the third resin layer 223 including a third relief layer 223c by providing the third resin between the other surface of the second substrate 230 and the third partial resin layer and stacking and integrating the second substrate 230 on one surface of the third resin layer 223. In the drawings, the third partial resin layer 223p fills all of the second one-surface corrugated portion 222a in the fourth step, but the present disclosure is not limited thereto. In the fourth step, a process may advance to fill only a part of the second one-surface corrugated portion 222a.

Figure 12:
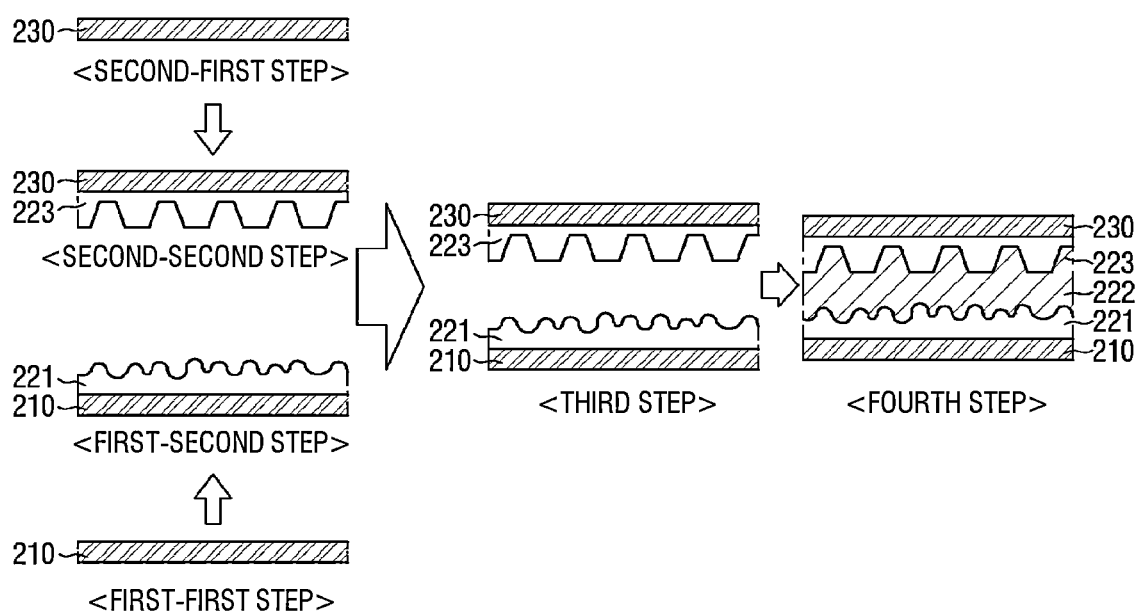
FIG. 12 is a schematic diagram illustrating the method for manufacturing the optical sheet according to the other embodiment.

FIG. 12 is a schematic diagram illustrating a method of manufacturing the optical sheet according to another embodiment.

Referring to FIG. 12, when the second substrate 230 is a transparent substrate acting as support the resin layer and having a light transmittance of 90% or more, the optical sheet 200 may be manufactured via a parallel process illustrated in FIG. 12.

As illustrated in FIG. 12, the manufacturing method according to the present embodiment includes a first process and a second process performed in parallel, and a third process performed by using an intermediate structure manufactured via the first process and the second process together.

The first process may include a first-first step of providing the first substrate 210, and a first-second step of forming the first resin layer 221 including the first relief portion 221c by imprinting the first resin on one surface of the first substrate 210 using the first pattern mold having a shape complementary to the first one-surface corrugated portion221a.

The second process may include a second-first step of providing the second substrate 230, and a second-second step of forming the third resin layer 223 including the third relief portion 223c by imprinting the third resin on the other surface of the second substrate 230 using a second pattern mold having a shape complementary to the third other-surface corrugated portion 223b.

The third process may include a third step of facing one surface of the first resin layer 221 formed by the first process and the other surface of the third resin layer 223 formed by the second process to face each other at predetermined intervals, and a fourth step of forming the second resin layer 222 including the second other-surface corrugated portion 222b, the second relief portion 222c, and the second one-surface corrugated portion 222a by providing the second resin between the first resin layer 221 and the third resin layer 223.

The detailed details of the present disclosure will be described with reference to the following detailed embodiments and experimental examples, and the contents not described herein may be technically inferred by those skilled in the art, and thus the description thereof will be omitted.

Example 1

Imprinting is performed on one surface of the TAC substrate including an anti-reflection layer with a structure in which a hard coating layer, a high refractive layer, and a low refractive layer are sequentially stacked on the other side thereof, by using an UV-curable resin with a liquid refractive index of 1.46 and a pattern mold having an inverse image of the hilly pattern of FIG. 6(c) having the plurality of concave portions and convex portions continuously formed thereon, Then, the first resin layer 221 having a haze value of 60% was formed by irradiating UV. Herein, the concave and convex portions, which are one surface pattern of the first resin layer 221, have a maximum depth Dmax of 7.78 μm, a surface roughness Ra of 0.859 μm, and a specular reflectance value of 2.2%.

Thereafter, the UV-curable resin having a liquid refractive index of 1.57 is coated on one surface of the first resin layer 221 to fill the concave portion of the first resin layer 221. One surface was imprinted using the pattern mold with an inverse shape of the pattern shape in FIG. 7(a) where the linear concave and convex portions extending in one direction are continuously formed, and then the second resin layer 222 was formed by irradiating the UV. Herein, the pattern shape in FIG. 7(a) was to have a plurality of convex portions with both recessed sides and a flat surface, and a shell-shaped concave portion with both protruding sides and the other flat surface between the convex portions, and a width and a height of one flat surface of the convex portion were 15 um and 22 um, respectively, and an interval between the convex portions was 10 um.

Then, the UV-curable resin having a liquid refractive index with adhesive properties of 1.46 was coated on one surface of the second resin layer 222 to fill the concave portion of the second resin layer 222 and form the third resin layer 223 where one surface is flat, and then the release film was combined on one surface of the third resin layer 223 to complete the high-visibility optical sheet 200.

Example 2

The high-visibility optical sheet 200 was manufactured in the same method as in Example 1, except that a haze value of the first resin layer 221 was 70%, a maximum depth Dmax of the concave and convex portions that have a one-surface pattern, was 8.4 m, a surface roughness Ra was 0.962 m, and a specular reflectance was 1.6%.

Example 3

The high-visibility optical sheet 200 was manufactured in the same method as in Example 1, except that a haze value of the first resin layer 221 was 80%, a maximum depth Dmax of the concave and convex portions that have a one-surface pattern, was 9.57 μm, a surface roughness Ra was 1.083 μm, and a specular reflectance was 1.22%.

Example 4

The high-visibility optical sheet 200 was manufactured in the same method as in Example 1, except that a haze value of the first resin layer 221 was 90%, a maximum depth Dmax of the concave and convex portions that have a one-surface pattern, was 10.23 μm, a surface roughness Ra was 1.168 μm, and a specular reflectance was 0.78%.

Example 5

Under the condition that the first resin layer was formed using a pattern mold with an inverted phase of an amorphous pattern instead of a hill pattern, the high-visibility optical sheet 200 was manufactured in the same method as in Example 1, except that a haze value of the first resin layer 221 was 60%, a maximum depth Dmax of the concave and convex portions that have a one-surface pattern, was 5.02 μm, a surface roughness Ra was 0.704 μm, and a specular reflectance was 2.12%.

Example 6

The high-visibility optical sheet 200 was manufactured in the same method as in Example 5, except that a haze value of the first resin layer 221 was 70%, a maximum depth Dmax of the concave and convex portions that have a one-surface pattern, was 6.74 μm, a surface roughness Ra was 0.766 μm, and a specular reflectance was 1.57%.

Example 7

The high-visibility optical sheet 200 was manufactured in the same method as in Example 5, except that a haze value of the first resin layer 221 was 80%, a maximum depth Dmax of the concave and convex portions that have a one-surface pattern, was 8.29 μm, a surface roughness Ra was 0.844 μm, and a specular reflectance was 0.94%.

Example 8

The high-visibility optical sheet 200 was manufactured in the same method as in Example 5, except that a haze value of the first resin layer 221 was 90%, a maximum depth Dmax of the concave and convex portions that have a one-surface pattern, was 9.15 μm, a surface roughness Ra was 0.941 μm, and a specular reflectance was 0.46%.

Comparative Example 1

The optical sheet 200 was manufactured in the same manner as in Example 1, except that one surface of the first resin layer 221 formed on one surface of the TAC substrate has a flat surface without forming the plurality of concave portions and convex portions. In this case, a specular reflectance of one surface of the first resin layer 221 was 5.51%.

Example 9

Under the condition that the convex portion of the first resin layer 221 is formed in a hemispherical pattern with different sizes (average diameter: 5 to 20 μm), the high-visibility optical sheet 200 was manufactured in the same method as in Example 1, except that a maximum depth Dmax of the first resin layer 221 was 14.83 μm, a surface roughness Ra was 1.76 μm, a specular reflectance was 1.33%, and a haze value was 80%.

Example 10

Under the condition that the convex portion of the first resin layer 221 is formed to have a smaller size (average diameter: 5 to 10 um) than the convex portion of Comparative Example 1, the high-visibility optical sheet 200 was manufactured in the same method as in Example 9, except that a maximum depth Dmax of the first resin layer 221 was 8.73 μm, a surface roughness Ra was 1.205 μm, a specular reflectance was 0.89%, and a haze value was 80%.

Example 11

The high-visibility optical sheet 200 was manufactured in the same method as in Example 9, except that a haze value of the first resin layer 221 was 90%, a maximum depth Dmax was 9.58 μm, a surface roughness Ra was 1.316 μm, and a specular reflectance was 0.62%.

Table 1 below has shown the specifications of the first resin layer 221 of Examples 1 to 11 and Comparative Example 1, and data obtained by measuring the surface roughness Ra1, the maximum depth Dmax, and the specular reflectance on one surface of the first resin layer 221 according to the specifications thereof. The surface roughness Ra and the maximum depth Dmax were measured under 1000 magnification conditions using a laser microscope (VK-X1050 model) made by Keyence. The specular reflectance value was calculated using a colorimeter (Ultra-Scan VIS) made by HunterLab. After a specimen with the first resin layer 221 on one surface of the TAC substrate was cut to a size of 40 mm×40 mm, total reflectance (RSIN) of the first one-surface corrugated portion and diffused reflectance (RSEX) of the first one-surface corrugated portion were sequentially measured using the chromometer, thus calculating the "specular reflectance" of the first one-surface corrugated portion using an "RSIN-RSEX" value.

layer 223 was made to face the water film layer, and an extending direction of the concave and convex portions of the second resin layer 222 extending in one direction is parallel to a short side of the LCD panel. After stacking the specimens of the optical sheet 200, a TV image was displayed to visually evaluate the moiré and sparkling phenomenon. The evaluation results for each item were evaluated with 1 to 5 points, but the side where the phenomenon was not viewed was evaluated with 5 points. The evaluation criteria are shown in Table 2 below.

TABLE 2

| Evaluation score | Visual Evaluation | Remark |
|---|---|---|
| 1 | Strongly visible | NG |
| 2 | Medium-visible | NG |
| 3 | Weakly visible | Excellent |
| 4 | More weakly visible | OK |
| 5 | Not visible | OK |

The evaluation results according to the above criteria are shown in Table 3 below, and only when each of the evaluation scores was 3 or higher, their evaluations were determined to be at an applicable level.

TABLE 1

| Item | Shape | Haze (Hz, %) | Surface Roughness of First One-Surface Corrugated Portion (Ra1, um) | Surface Roughness of Second One-Surface Corrugated Portion (Ra2, um) | Maximum Depth (Dmax, um) | Specular Reflectance (Re, %) |
|---|---|---|---|---|---|---|
| Example 1 | Hilly | 60 | 0.859 | 7.42 | 7.78 | 2.2 |
| Example 2 | | 70 | 0.962 | | 8.4 | 1.6 |
| Example 3 | | 80 | 1.083 | | 9.57 | 1.22 |
| Example 4 | | 90 | 1.168 | | 10.23 | 0.78 |
| Example 5 | Amorphous | 60 | 0.704 | | 5.02 | 2.12 |
| Example 6 | | 70 | 0.766 | | 6.74 | 1.57 |
| Example 7 | | 80 | 0.844 | | 8.29 | 0.94 |
| Example 8 | | 90 | 0.941 | | 9.15 | 0.46 |
| Comparative Example 1 | No corrugated portion | — | | | | 5.51 |
| Example 9 | Hemispherical (5~20 um, Random pattern) | 80 | 1.76 | | 14.83 | 1.33 |
| Example 10 | Hemispherical (5~10 um, Random pattern) | 80 | 1.205 | | 8.73 | 0.89 |
| Example 11 | | 90 | 1.316 | | 9.58 | 0.62 |

Experimental Example

After the specimens of the optical sheets 200 according to Examples 1 to 11 and Comparative Example 1 were cut into A4 sizes, they were stacked onto the surface of an LCD panel for a 65-inch TV. In this case, after forming a water film layer on a surface of the LCD panel to remove an air layer between the surface of the LCD panel and the specimen, the specimens were stacked such that the third resin

TABLE 3

| Item | Moiré | Sparkling | Total |
|---|---|---|---|
| Example 1 | 2 | 2 | 4 |
| Example 2 | 4 | 3 | 7 |
| Example 3 | 4 | 4 | 8 |
| Example 4 | 5 | 4 | 9 |
| Example 5 | 2 | 2 | 4 |

TABLE 3-continued

| Item | Moiré | Sparkling | Total |
|---|---|---|---|
| Example 6 | 3 | 2 | 5 |
| Example 7 | 4 | 4 | 8 |
| Example 8 | 5 | 5 | 10 |
| Comparative Example 1 | 1 | 5 | 6 |
| Example 9 | 3 | 1 | 4 |
| Example 10 | 2 | 2 | 4 |
| Example 11 | 3 | 2 | 5 |

Thereafter, the specimens of the optical sheets 200 according to Examples 1 to 11 and Comparative Example 1 were evaluated by dividing the degree of moiré observed at each angle while tilting 1 degree clockwise and counter-clockwise to a maximum of 14 degrees in a central angle (central angle: a long side direction of the LCD panel and a pattern extension direction of the second resin layer 222 being the same as each other) into "strong," "medium," "weak," and "-(OK)." The results are shown in Table 4. In Table 4, an "angle" indicates an angle at which an extending direction of the concave portion and the convex portion of the second resin layer 222 is formed with a long side of the LCD panel.

alignment between a pixel arrangement direction and a pattern extension direction at the time of combining the upper polarizing film 150 and the optical sheet 200 according to the present disclosure, a display device with excellent image quality may be provided. Therefore, a high production yield may be expected. In addition, in the case of Examples 3 and 4, and Preparation Examples 7 and 8, sparkling defects due to the first one-surface corrugated portion 221a may be prevented, thereby implementing more excellent image quality. On the other hand, in the case of Comparative Example 1 in which the first one-surface corrugated portion 221a was not provided on one surface of the first resin layer 221, since the first one-surface corrugated portion 221a was not provided, there were no sparkle defects, but the moiré phenomenon was observed at most angles as well as the central angle. In order to minimize the moiré phenomenon, it is necessary to tilt the pattern extension direction of the second resin layer 222 with respect to the pixel alignment direction to have a −14° or +14° angle, which is closest to the center angle and has the weakest moiré phenomenon. However, even in this case, it was confirmed that the moiré phenomenon failed to disappear and there was a risk of increasing the moiré phenomenon even with a fine alignment error.

TABLE 4

| Angle | Comparative Example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| 76° | — | — | — | — | — | weak | weak | — | — | — | weak | medium |
| 77° | medium | weak | weak | — | — | — | — | — | weak | medium | — | — |
| 78° | strong | — | medium | medium | weak | weak | — | — | — | — | weak | — |
| 79° | weak | — | weak | — | — | medium | weak | — | — | — | weak | weak |
| 80° | — | weak | — | — | weak | weak | medium | medium | — | weak | medium | medium |
| 81° | strong | medium | medium | — | — | — | weak | weak | weak | weak | weak | — |
| 82° | medium | — | weak | — | — | — | — | weak | — | medium | — | weak |
| 83° | weak | weak | — | — | weak | weak | weak | — | — | weak | — | weak |
| 84° | weak | weak | weak | weak | — | weak | weak | — | — | weak | weak | — |
| 85° | strong | weak | medium | weak | — | weak | — | — | — | — | weak | — |
| 86° | medium | weak | weak | — | — | — | — | — | — | — | medium | — |
| 87° | weak | weak | — | — | — | weak | — | — | — | weak | weak | — |
| 88° | medium | weak | — | — | — | medium | weak | — | — | weak | medium | weak |
| 89° | strong | medium | — | — | — | medium | weak | — | — | weak | medium | weak |
| 90° | strong | medium | — | — | — | medium | weak | — | — | weak | medium | weak |
| 91° | strong | medium | — | — | — | medium | weak | — | — | weak | medium | weak |
| 92° | strong | weak | — | — | — | weak | weak | — | — | weak | weak | weak |
| 93° | weak | weak | — | — | — | medium | — | — | — | weak | medium | — |
| 94° | weak | medium | weak | — | — | medium | — | — | — | weak | weak | — |
| 95° | strong | medium | weak | weak | — | weak | — | — | — | — | — | — |
| 96° | weak | weak | medium | weak | — | weak | — | weak | — | weak | medium | medium |
| 97° | medium | weak | weak | — | — | weak | weak | medium | — | weak | — | weak |
| 98° | weak | weak | medium | — | — | — | medium | — | weak | medium | weak | weak |
| 99° | medium | — | weak | — | weak | medium | weak | weak | weak | weak | weak | weak |
| 100° | medium | — | — | — | weak | medium | weak | — | — | — | weak | weak |
| 101° | strong | — | medium | — | — | weak | weak | — | — | medium | weak | — |
| 102° | — | medium | weak | — | — | weak | — | — | — | weak | weak | weak |
| 103° | medium | weak | — | weak | weak | — | — | medium | — | weak | — | weak |
| 104° | — | weak | — | medium | — | — | weak | — | weak | — | weak | — |

Referring to Table 2, Table 3 and Table 4, in Examples 2 to 4, and Examples 7 and 8, the moiré phenomenon was not observed at most angles or was mainly observed at a "weak" level at some angles, and the moiré phenomenon was hardly observed at a central angle (900)±30. That is, even though the pixel arrangement direction of the LCD panel and the pattern extension direction of the second resin layer 222 are arranged in the same direction, the moiré phenomenon does not occur, and the moiré phenomenon does not occur by ±3° from the pixel arrangement direction, and accordingly, it may be confirmed that even though there was an error in In other words, in Comparative Example 1, when only 1° is turned, moiré defects may occur to significantly degrade the quality and productivity of the display device, and the quality and productivity of the pattern mold processed for tilting of the optical sheet 200 may be greatly degraded. In addition, even when manufacturing the optical sheet 200, since an optimal tilt angle may be changed according to the specifications of the display device, the quality and productivity may be further degraded, resulting in a large increase in manufacturing costs.

In addition, the first one-surface corrugated portion 221a may include the first resin layer 221 including a hemispherical convex portion, as in Examples 9 to 11; however, in this case, it may be seen that even if the first one-surface corrugated portion 221a is formed such that the first resin layer 221 has a haze value of 80% or more as in Examples 3 and 4 or Example 7 or 8, the moiré and sparkling defects are still present, which makes it impossible to mount the optical sheet on the display device. This may be determined according to a structure defined by the surface roughness Ra, the maximum depth Dmax, and/or the specular reflectance Rs of the first one-surface corrugated portion 221.

Although the embodiments of the present disclosure have been described above with reference to the accompanying drawings, the present disclosure is not limited to the disclosed embodiments, but may be implemented in various different ways, and the present disclosure may be embodied in many different forms without changing technical subject matters and essential features as will be understood by those skilled in the art. Therefore, embodiments set forth herein are exemplary only and not to be construed as a limitation.

The invention claimed is:

1. An optical sheet, comprising:
a first substrate;
a first resin layer disposed on one surface of the substrate;
a second resin layer disposed on one surface of the first resin layer; and
a third resin layer disposed on one surface of the second resin layer,
wherein the first resin layer includes a first one-surface corrugated portion formed on one surface thereof and having a plurality of convex portions and concave portions,
the second resin layer includes a second other-surface corrugated portion formed on the other surface thereof and having a pattern shape complementary to that of the first one-surface corrugated portion,
the second resin layer includes a second one-surface corrugated portion formed on one surface thereof, having a plurality of convex portions and concave portions and having a surface roughness value greater than that of the first one-surface corrugated portion, and
the third resin layer has a third other-surface corrugated portion formed on the other surface thereof and having a pattern shape complementary to that of the second one-surface corrugated portion.

2. The optical sheet of claim 1, wherein one surface of the third resin layer is flat.

3. The optical sheet of claim 2, wherein the third resin layer includes an adhesive material.

4. The optical sheet of claim 1, wherein the second resin layer has a higher solid-state refractive index than the first resin layer and the third resin layer.

5. The optical sheet of claim 4, wherein the third resin layer has a higher solid-state refractive index than the first resin layer.

6. The optical sheet of claim 4, wherein the first resin layer, the second resin layer, and the third resin layer include a same resin.

7. The optical sheet of claim 1, wherein the first one-surface corrugated portion includes an irregular pattern, and the second one-surface corrugated portion includes a regular pattern.

8. The optical sheet of claim 1, wherein the first one-surface corrugated portion has a haze value of 70% to 95% and a surface roughness of 0.85 to 1.16 um.

9. The optical sheet of claim 1, wherein the first one-surface corrugated portion has a maximum depth of 8.3 um to 10.2 um.

10. The optical sheet of claim 1, wherein the first one-surface corrugated portion has a specular reflectance of 1.6% or less.

11. The optical sheet of claim 1, wherein the first resin layer includes a first relief portion between the first one-surface corrugated portion and the first substrate,
the second resin layer includes a second relief portion between the second one-surface corrugated portion and the second other-surface corrugated portion, and
the third resin layer includes a third relief portion between the third other-surface corrugated portion and one surface of the third resin layer, and
an average thickness of the second relief portion is greater than an average thickness of the first relief portion and the third relief portion.

12. The optical sheet of claim 1, wherein an average thickness of the third relief portion is greater than the average thickness of the first relief portion.

13. The optical sheet of claim 1, further comprising an anti-reflection layer disposed on the other surface of the first substrate,
wherein the anti-reflection layer has a structure in which a hard coating layer and a low refractive layer with a refractive index of 1.4 or less are sequentially stacked, or a structure in which the hard coating layer, a high refractive layer with a refractive index of 1.6 or more, and the low refractive layer with the refractive index of 1.4 or less are sequentially stacked.

14. The optical sheet of claim 1, wherein the third resin layer includes a third one-surface corrugated portion formed on one surface thereof and having a plurality of convex portions and concave portions.

15. The optical sheet of claim 1, further comprising a second substrate disposed on one surface of the third resin layer.

16. The optical sheet of claim 1, further comprising a polarizing film disposed on one surface of the third resin layer.

17. A method for manufacturing an optical sheet, the method comprising:
providing a first substrate;
forming a first resin layer including a first one-surface corrugated portion on one surface of the first substrate by imprinting a first resin using a first pattern mold;
forming a second resin layer including a second one-surface corrugated portion on one surface of the first resin layer by imprinting a second resin using a second pattern mold;
forming a third partial resin layer by providing a third resin on the second one-surface corrugated portion of the second resin layer; and
forming a third resin layer by providing a second substrate and providing the third resin between the other surface of the second substrate and the third partial resin layer after the other surface of the second substrate and one surface of the third partial resin layer are disposed to face each other at predetermined intervals.

18. A method for manufacturing an optical sheet, the method comprising:
forming a first resin layer including a first one-surface corrugated portion on one surface of a first substrate by imprinting a first resin using a first pattern mold;

forming a third resin layer including a third other-surface corrugated portion by imprinting a third resin on the other surface of a second substrate using a second pattern mold; and forming a second resin layer including a second other-surface corrugated portion and a second one-surface corrugated portion by providing a second resin between the first resin layer and the third resin layer after one surface of the first resin layer and the other surface of the third resin layer are disposed to face each other at predetermined intervals.

19. A display device comprising:

a display panel, and an optical sheet disposed on an upper surface of the display panel, wherein the optical sheet comprises:

a first substrate;

a first resin layer disposed on one surface of the first substrate;

a second resin layer disposed on one side of the first resin layer; and a third resin layer disposed on one surface of the second resin layer, wherein the first resin layer includes a first one-surface corrugated portion formed on one surface thereof and having a plurality of convex portions and concave portions, the second resin layer includes a second other-surface corrugated portion formed on the other surface thereof and having a pattern shape complementary to that of the first one-surface corrugated portion, the second resin layer includes a second one-surface corrugated portion formed on one surface thereof, having a plurality of convex portions and concave portions and having a surface roughness greater than that of the first one-surface corrugated portion, the third resin layer includes a third other-surface corrugated portion formed on the other surface thereof and having a pattern shape complementary to that of the second one-surface corrugated portion, and the optical sheet is disposed on the upper surface of the display panel such that the first substrate is disposed farther than the third resin layer with respect to the upper surface of the display panel.

20. The display device of claim 19, further comprising a polarizing film disposed between the upper surface of the display panel and the optical sheet, wherein an upper surface of the polarizing film is in contact with one surface of the third resin layer.

* * * * *